(12) United States Patent
Morris

(10) Patent No.: US 8,037,911 B2
(45) Date of Patent: Oct. 18, 2011

(54) WHEEL INCLUDING TREAD COUPLED TO RIM

(75) Inventor: Michael A. Morris, Rancho Palos Verdes, CA (US)

(73) Assignee: Geo Plastics, Los Angeles, CA (US)

( * ) Notice: Subject to any disclaimer, the term of this patent is extended or adjusted under 35 U.S.C. 154(b) by 303 days.

(21) Appl. No.: 12/204,718

(22) Filed: Sep. 4, 2008

(65) Prior Publication Data

US 2010/0052412 A1   Mar. 4, 2010

(51) Int. Cl.
*B60B 5/02* (2006.01)
(52) U.S. Cl. ............ 152/323; 152/393; 301/64.701
(58) Field of Classification Search ............ 152/323, 152/393, 394; 301/64.701, 64.702, 64.703
See application file for complete search history.

(56) References Cited

U.S. PATENT DOCUMENTS

| | | | |
|---|---|---|---|
| 971,301 A * | 9/1910 | Moore ............ 152/515 |
| 1,491,559 A | 4/1924 | Slick | |
| 3,263,315 A * | 8/1966 | O'Brien ............ 29/894.324 |
| 3,387,894 A * | 6/1968 | Louik ............ 301/64.701 |
| 3,578,812 A | 5/1971 | Taussig | |
| D221,833 S | 9/1971 | Haydock | |
| 3,730,594 A * | 5/1973 | Zbikowski ............ 301/64.701 |
| 3,807,474 A | 4/1974 | Wendt | |
| 3,843,202 A * | 10/1974 | Lacerte ............ 301/64.701 |
| 3,907,370 A * | 9/1975 | Bard ............ 301/63.102 |
| 3,952,786 A | 4/1976 | Kreling et al. | |
| 4,095,846 A * | 6/1978 | Agins ............ 301/37.104 |
| 4,170,384 A * | 10/1979 | Rotheiser ............ 301/64.707 |
| 4,208,073 A * | 6/1980 | Hechinger ............ 301/5.302 |
| 4,286,825 A * | 9/1981 | Sieving ............ 301/95.105 |
| 4,351,084 A * | 9/1982 | Fontana ............ 16/45 |
| 4,444,435 A | 4/1984 | Honsa | |
| 4,447,093 A * | 5/1984 | Cunard et al. ............ 301/64.704 |
| 4,567,633 A | 2/1986 | Corkery | |
| 4,592,595 A * | 6/1986 | Freeman ............ 301/5.308 |
| 4,870,736 A * | 10/1989 | Kacalieff ............ 29/894.31 |
| 4,879,794 A * | 11/1989 | Djerf ............ 29/894.31 |
| D327,048 S | 6/1992 | Markling et al. | |
| D328,053 S | 7/1992 | Markling | |
| 5,167,439 A * | 12/1992 | Green et al. ............ 301/5.1 |
| 5,316,377 A * | 5/1994 | Markling et al. ............ 301/64.701 |
| D352,687 S | 11/1994 | Markling | |

(Continued)

FOREIGN PATENT DOCUMENTS

EP          0602738          6/1994

(Continued)

OTHER PUBLICATIONS

International Search Report and Written Opinion for International Application No. PCT/US2009/053780, mailed on Feb. 19, 2010, in 15 pages.

*Primary Examiner* — Russell Stormer

(74) *Attorney, Agent, or Firm* — Knobbe, Martens, Olson & Bear, LLP

(57) ABSTRACT

Wheels and methods of making wheels are disclosed including an inner portion and a tread mechanically coupled to the inner portion. The tread may be mechanically coupled to the inner portion on an inside and an outside of the wheel. The inner portion may include a rim including a plurality of apertures. The inner portion may be high density polyethylene and the tread may be thermoplastic elastomer.

39 Claims, 23 Drawing Sheets

U.S. PATENT DOCUMENTS

| | | |
|---|---|---|
| D391,731 S | 3/1998 | Wu |
| D410,312 S | 5/1999 | Liao |
| 5,902,018 A | 5/1999 | Owen et al. |
| 5,934,763 A * | 8/1999 | Conradsson et al. .... 301/64.701 |
| D419,516 S | 1/2000 | Gagnon |
| D422,258 S | 4/2000 | Hale, Jr. |
| 6,170,920 B1 | 1/2001 | Markling |
| D444,283 S | 6/2001 | Konkle |
| D444,284 S | 6/2001 | Konkle |
| D444,757 S | 7/2001 | Ward |
| 6,616,506 B1 | 9/2003 | Morrison |
| 6,913,324 B2 * | 7/2005 | Markling ................. 301/111.01 |
| D542,003 S | 5/2007 | Morris |
| D567,730 S | 4/2008 | Polka |
| D570,070 S | 5/2008 | Morris |
| 7,481,498 B1 * | 1/2009 | Morris .................... 301/64.707 |
| D586,071 S | 2/2009 | Morris |
| D586,072 S | 2/2009 | Morris |
| D632,044 S | 2/2011 | Morris |
| 2007/0029020 A1 | 2/2007 | Wietharn et al. |
| 2008/0006456 A1 | 1/2008 | Lucas |

FOREIGN PATENT DOCUMENTS

| | | |
|---|---|---|
| KR | 2001-0084273 | 9/2001 |
| KR | 2008-0012476 | 2/2008 |
| KR | 2008-0075073 | 8/2008 |
| WO | WO 02/30685 | 4/2002 |

* cited by examiner

WHEEL INCLUDING TREAD COUPLED TO RIM

BACKGROUND

1. Field

The present application generally relates to wheels, and, more particularly, to wheels including a tread.

2. Description of the Related Art

The use of plastic wheels on a variety of products has dramatically increased in recent years. One area where such plastic wheels have been widely employed is on wheeled refuse or garbage carts or bins of the type commonly employed by homeowners or commercial businesses for their trash and recyclables. Some plastic wheels produce abundant noise when rolled along hard surfaces. Additionally, some varieties of plastic are prone to chipping, fracturing, and breakage when a product comprising the wheels is rolled along certain surfaces. This can especially be an issue when these wheels support heavier loads. Such wheels may be prone to causing a disturbance and/or breaking. Accordingly, various wheel assemblies have been devised in which a rubber or rubber-like material is chemically bonded or mechanically fastened to the plastic wheel.

SUMMARY

In certain embodiments, a wheel comprises an inner assembly and an outer assembly. The inner assembly includes a rim generally formed around a hub. The rim includes a cross-section having a first side, a second side generally opposite the first side, a ground-facing surface, and a hub-facing surface. The outer assembly comprises a material different from that of the inner assembly. The outer assembly is mechanically coupled through the rim at the first and second sides of the rim. The outer assembly at least partially covers the ground-facing surface of the rim and extends below the hub-facing surface of the rim. The hub-facing surface of the rim is generally devoid of the material of the outer assembly.

In certain embodiments, a method of manufacturing a wheel comprises forming a first part of the wheel, forming a second part of the wheel, and mechanically coupling the second part of the wheel to the first part of the wheel. The second part of the wheel comprises a different material than the first part of the wheel. The first part comprises a hub and a rim. The rim includes a cross-section having a first side, a second side generally opposite the first side, a ground-facing surface, and a hub-facing surface. Mechanically coupling the second part of the wheel to the first part of the wheel includes weaving the material of the second part through the rim at the first and second sides of the rim. After mechanically coupling the second part of the wheel to the first part of the wheel, the material of the second part of the wheel at least partially covers the ground-facing surface of the rim, the material of the second part of the wheel extends below the hub-facing surface of the rim, and the hub-facing surface of the rim is generally devoid of the material of the second part of the wheel.

In certain embodiments, a method of manufacturing a wheel comprises molding a first material into a first part of the wheel and molding a second material into a second part of the wheel. The first part comprises a hub and a rim. The rim includes a cross-section having a first side, a second side generally opposite the first side, a ground-facing surface, and a hub-facing surface. Molding the second material comprises mechanically coupling the second part of the wheel through the rim at the first and second sides of the rim. After molding the second material, the second material at least partially covers the ground-facing surface of the rim, the second material extends below the hub-facing surface of the rim, and the hub-facing surface of the rim is generally devoid of the second material.

In certain embodiments, a wheel comprises a hub and a rim generally formed around the hub. The rim comprises a plurality of generally hollow features and a flange disposed radially outward of the generally hollow features.

In certain embodiments, a wheel comprises an inner piece and an outer piece mechanically coupled to the inner piece. The outer piece comprises rubber or rubber-like material. The inner piece comprises a material that does not chemically bond to the rubber or rubber-like material.

In certain embodiments, a wheel comprises an inner piece and an outer piece mechanically coupled to the inner piece. The inner piece comprises high density polyethylene (HDPE). The outer piece comprises a material that does not chemically bond to HDPE.

In certain embodiments, a wheel comprises an inner piece and an outer piece mechanically coupled to the inner piece. The inner piece comprises acrylonitrile butadiene styrene (ABS). The outer piece comprises a material that does not chemically bond to ABS.

In certain embodiments, a wheel comprises an inner piece and an outer piece mechanically coupled to the inner piece. The outer piece comprises thermoplastic elastomer (TPE) or thermoplastic urethane (TPU). The inner piece comprises a material that does not chemically bond to TPE or TPU.

In certain embodiments, a wheel comprises an inner piece and an outer piece mechanically coupled to the inner piece. The inner piece comprises high density polyethylene (HDPE). The outer piece comprises thermoplastic elastomer (TPE) or thermoplastic urethane (TPU).

In certain embodiments, a wheel comprises an inner piece and an outer piece mechanically coupled to the inner piece. The inner piece comprises acrylonitrile butadiene styrene (ABS). The outer piece comprises thermoplastic elastomer (TPE) or thermoplastic urethane (TPU).

In certain embodiments, a wheel comprises an inner section and an outer section comprising a different material than the inner section. The outer section is mechanically coupled to the inner section. A ratio of weight of the outer section to weight of the inner section is less than about 0.5:1.

In certain embodiments, an injection-molded wheel comprises a plastic inner section and an outer section comprising a different material than the inner section. The outer section is mechanically coupled to the inner section. A ratio of weight of the outer section to weight of the inner section is less than about 0.4:1.

In certain embodiments, a wheel comprises an inner portion and an outer section comprising a different material than the inner section. The outer section is mechanically coupled to the inner portion. The inner portion comprises a rim and a hub. A cross-section of the rim has a first side and a second side generally opposite the first side. The second side is configured to face away from an axle. A ratio of a radial width of the outer portion on the second side of the rim to a radius of the wheel is between about 0.05:1 and about 0.5:1.

In certain embodiments, a wheel comprises an inner portion and an outer section comprising a different material than the inner section. The outer section is mechanically coupled to the inner portion. The inner portion comprises a rim and a hub. A cross-section of the rim has a first side and a second side generally opposite the first side. The second side is configured to face away from an axle. Weight of the outer portion divided by radius of the wheel is between about 0.5 lb/ft (approximately 740 g/m) and about 1.5 lb/ft (approximately 2,200 g/m).

In certain embodiments, an injection-molded wheel comprises a plastic inner portion and an outer section comprising a different material than the inner section. The outer section is mechanically coupled to the inner portion. The inner portion comprises a rim and a hub. A cross-section of the rim has a first side and a second side generally opposite the first side. The second side is configured to face away from an axle. A ratio of a radial width of the outer portion on the second side of the rim to a radius of the wheel is between about 0.1:1 and about 0.3:1. Weight of the outer portion divided by radius of the wheel is between about 0.5 lb/ft (approximately 1,200 g/m) and about 1.5 lb/ft (approximately 1,500 g/m).

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught or suggested herein without necessarily achieving other objects or advantages as may be taught or suggested herein.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other features, aspects, and advantages of the invention disclosed herein are described below with reference to the drawings of certain embodiments, which are intended to illustrate and not to limit the invention.

DETAILED DESCRIPTION

Figure 1:
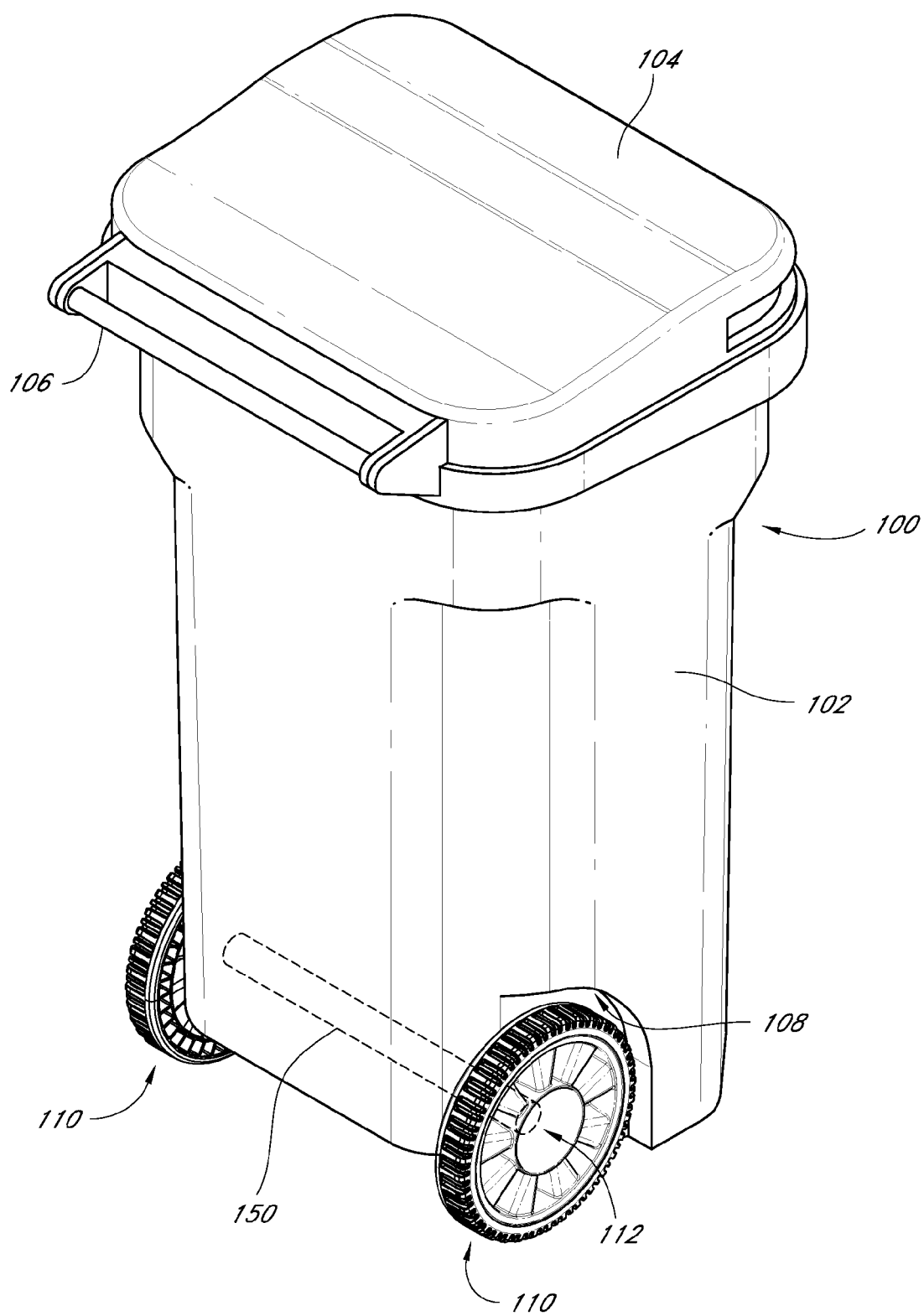
FIG. 1 is a top/front/side perspective view of a refuse cart including a wheel assembly according to an example embodiment of the present disclosure mounted thereto.

Although certain embodiments and examples are disclosed below, it will be understood by those in the art that the invention extends beyond the specifically disclosed embodiments and/or uses of the invention and obvious modifications and equivalents thereof. Thus, it is intended that the scope of the invention herein disclosed should not be limited by the particular disclosed embodiments described below.

Certain embodiments described herein include treads that are coupled to plastic inner portions of wheels. The tread may reduce noise produced during rolling and protect the plastic inner portion from damage. In some embodiments, the tread is mechanically coupled to the inner portion on an inside and an outside of the wheel such that foreign matter cannot easily become lodged between the tread and the inner portion and such that tampering with either side of the wheel does not lead to easy disassembly of the tread from the inner portion. A mechanical coupling allows, but does not require, the wheel to comprise materials that do not chemically bond to each other or that poorly chemically bond to each other. Accordingly, embodiments described herein may increase the number of possible materials available to be used for the parts of the wheel, which may optionally bring about numerous advantages.

For example, increasing the number of possible materials for the parts of the wheel may reduce the costs of manufacturing the wheel by permitting the use of less expensive materials (e.g., use of HDPE rather than polypropylene). For another example, increasing the number of possible materials for the parts of the wheel may increase the ability of the manufacturer to more freely select certain materials that are adapted for use in specific parts of the wheel (e.g., use of HDPE for the inner portion based on its high tensile strength, hardness, and/or operable temperature range). For yet another example, increasing the number of possible materials for the parts of the wheel may increase the ability to select certain materials for certain parts of the wheel that are adapted for use under certain conditions, which can allow a manufacturer to customize wheels for certain customers and/or products (e.g., use of HDPE for wheels to be used in cold climates).

Certain embodiments described herein may allow for the aesthetic visual appearance of a thick tread using a relatively small amount of tread material. Reduction of the amount of rubber or rubber-like material may reduce the costs of manufacturing the wheel while still remaining functionally practical. In some wheels, the tread material is more expensive than the inner portion material (e.g., TPE may be more expensive than HDPE and polypropylene). Some wheel uses only need a modest amount of tread to reduce noise and/or protect the inner portion, but consumers may prefer the appearance of thicker tread. Accordingly, certain embodiments described herein may permit reducing the thickness of the tread that contacts the ground, while still being thick enough to remain functional, but increase the apparent thickness of the tread by extending the tread radially inward along an outer side of the wheel, thereby still remaining aesthetically pleasing. In some embodiments, this duality (reduced tread amount but thick tread appearance) may be expressed as a ratio between the weight of the inner portion to the weight of the outer portion, a ratio of the radius of the outer portion to the radius of the wheel, the radius of the outer portion divided by the radius of the wheel, combinations thereof, and the like.

The wheels and wheel assemblies described herein can be used in connection with numerous wheeled devices. FIG. 1 illustrates an example embodiment of a refuse cart 100 comprising plurality of wheels 110 mounted on an axle 150 at the lower end of the cart body 102. Each of the wheels 110 includes a tread that is coupled to an inner portion, as described in further detail in the present disclosure. A hinged lid 104 optionally can be provided, and the cart 100 can be tilted or tipped about the wheels 110 using handle 106 so as to enable rolling of the cart 100 for the transport of refuse, for example between a location for filling the cart 100 and a location for pickup by a refuse disposal company. The lower end of the cart body 102 optionally includes a wheel well or recess area 108 configured to receive wheels 110, for example to protect the wheels 110 and as a cosmetic structure. The wheels 110 may be secured on the axle 150 by a hub assembly 112. Each wheel 150 may be spaced from the cart 100 by a spacer, which may be integrated with the wheel 150 or a hub assembly. The axle 150 may extend partially into a wheel 110 (e.g., as illustrated in FIG. 1) or fully through a wheel 110, depending on the mechanism for securing the wheel 110 to the axle 150. The wheels 110 described herein may also be suitable for use with many other wheeled products, including without limitation, wagons, wheeled food and beverage coolers, barbecues, wheeled toys, small refuse containers, dollies, hand trucks, medical devices (e.g., hospital beds, intravenous fluid holders), and the like.

In wheels comprising a tread that is chemically bonded to a plastic inner portion, the types of materials that may be used for both the wheel and the tread are limited to those materials that can chemically bond to each other. For example, if the tread comprises thermoplastic elastomer, the plastic inner portion is generally limited to polypropylene because a large number of TPEs contain some polypropylene, thereby providing a basis for a suitable chemical bond. In certain embodiments of wheels comprising a tread that is mechanically bonded to a plastic inner portion, the tread may become unfastened from the plastic inner portion due to wear, lateral forces, tampering, etc. For example, if the tread is radially coupled to the plastic inner portion as described in U.S. Pat. Nos. 4,444,435 to Honsa and 4,567,633 to Corkery, lateral forces on the wheel may cause the tread to become dislodged from the connection point or to tear proximate to the connection point. Additionally, foreign material may become lodged between the tread and the plastic inner portion, which may cause uneven tread wear and/or poor performance. Certain embodiments described herein may avoid the disadvantages of previous mechanical couplings by reducing the likelihood of becoming unfastened. For example, fastening the tread to the outer side of a plastic portion can make a wheel attached to a cart less prone to tampering (e.g., because a force roughly parallel to the plane of the wheel would have to be manipulated to cause even slight partial separation of the wheel parts). Certain embodiments described herein may include parts that are both chemically and mechanically bonded to each other, which may avoid the disadvantages of previous chemical couplings and previous mechanical couplings.

Figure 2A:
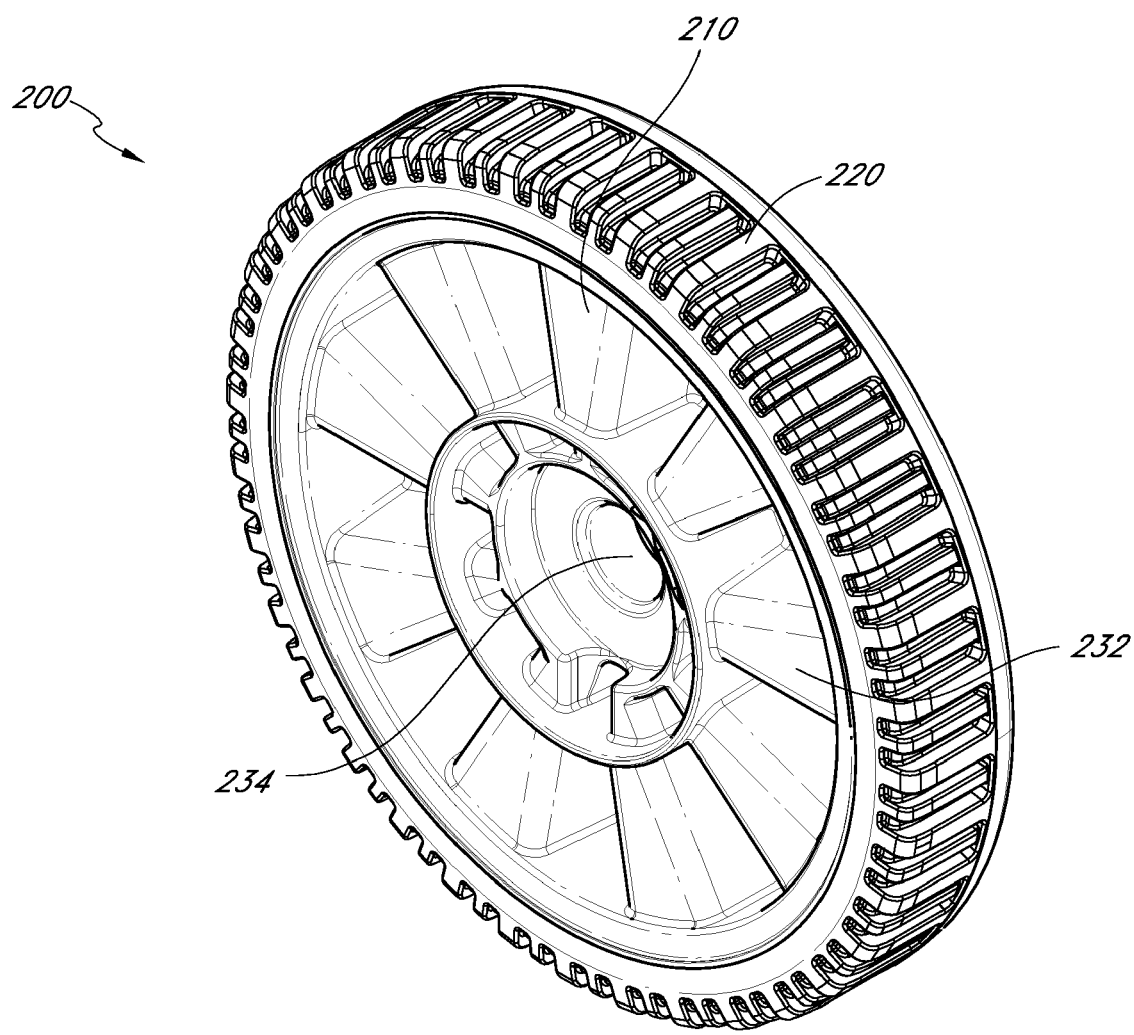
FIG. 2A is a top/front/side perspective view of an example embodiment of a wheel.

FIG. 2A illustrates an example embodiment of a wheel 200. The wheel 200 comprises a first or inner section (or first or outer assembly, part, piece, section, etc.) 210 and a second or outer section (or second or outer assembly, part, piece, section, etc.) 220. The outer section 220 is mechanically coupled to the inner section 210. In certain embodiments, the outer section 220 may also be chemically bonded to the inner section 210. The outer section 220 may reduce noise produced during rolling of the wheel 200. In some embodiments, the outer section 220 is mechanically coupled to the inner section 210 on the inside (e.g., the side facing the axle) and the outside (e.g., the side facing away from the axle) such that foreign matter or tools cannot easily become lodged or inserted between the outer section 220 and the inner section 210. In some embodiments, the outer section 220 is mechanically coupled to the inner section 210 on the inside and the outside such that tampering with either side of the wheel 200 does not lead to easy disassembly of the outer section 220 from the inner section 210. In certain embodiments, mechanical coupling produces opportunities to utilize materials that may not or may poorly chemically bond to each other. Some such materials may have reduced cost and/or better physical properties (e.g., wear, abrasion resistance, extreme temperature performance, response to impact, memory after impact, etc.) versus standard materials with bonding characteristics.

In the illustrated embodiment, the wheel 200 comprises a plurality of spokes 232 extending radially outward from an axle-bearing portion 234. In some embodiments, the axle-bearing portion 234 is configured to interact with an axle 150. For example, certain such embodiments may be mounted on the end on an axle 150 by a hub member or push-on fastener (e.g., a pawl nut). In some embodiments, the axle-bearing portion 234 is configured to receive a through-bore sleeve that allow the wheel 200 to be mounted on the end on an axle 150 by a hub member or push-on fastener (e.g., a pawl nut). In certain such embodiments, the sleeve may include an integrated spacer configured to space the inner side of the wheel 200 from, for example, the recess area 108 of a cart 100. Separate spacers are also possible.

In certain alternative embodiments, the axle-bearing portion 234 is configured to receive a sleeve or hub assembly that is configured to interact with an axle 150 (e.g., snap onto an end of an axle 150). For example, co-owned U.S. Pat. No. 7,377,597, entitled "Wheel Assembly Having Wheel-Mounting Sleeve and Retainer;" U.S. Pat. No. 6,375,274, entitled "Plastic Wheel Assembly and Mounting Sleeve Therefor;" and U.S. patent application Ser. No. 11/944,322, entitled "Wheel and Hub Assembly," filed Nov. 21, 2007; each describe example embodiments of sleeves that could be inserted into the axle-bearing portion 234 of the wheel 200. Each of the foregoing references is incorporated by reference herein in its entirety. In certain such embodiments, the sleeve may include an integrated spacer configured to space the inner side of the wheel 200 from, for example, the recess area 108 of a cart 100. Separate spacers are also possible. Other sleeves, hub assemblies, devices, and methods of mechanically coupling the wheel 200 to an axle 150 are also possible.

In some embodiments, the axle-bearing portion 234 is centered within the inner portion 210 such that a wheel into which an axle 150 is inserted into the axle-bearing portion 234 (e.g., into a hub assembly at least partially disposed within the axle-bearing portion 234) can uniformly rotate around the axle 150. An appropriate axle-bearing portion 234 and/or sleeve or hub assembly may be selected based on, for example, anticipated use conditions or type of axle 150 (e.g., chamfered or non-chamfered).

Figure 2B:
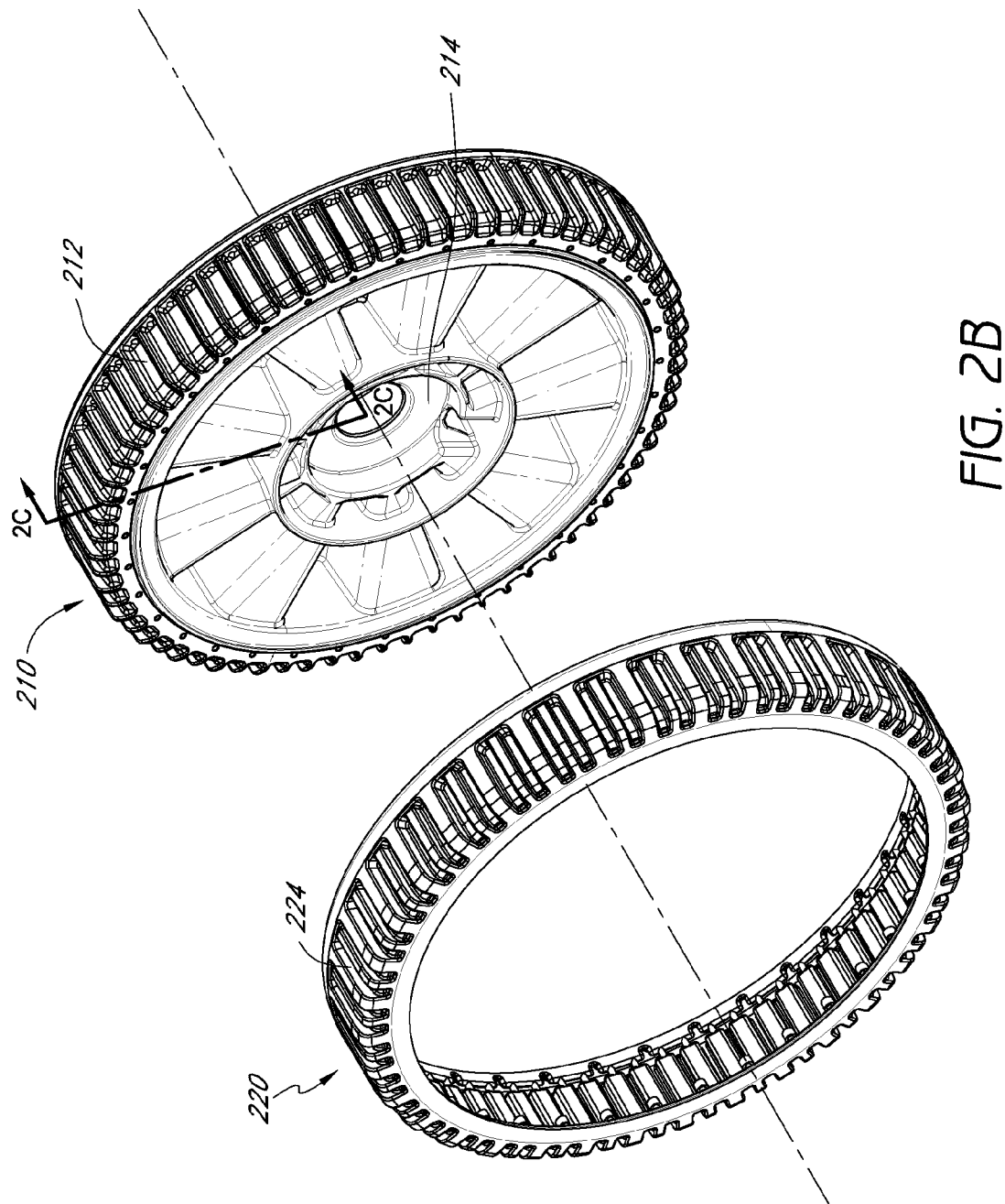
FIG. 2B is an exploded perspective view of the wheel of FIG. 2A.
Figure 2C:
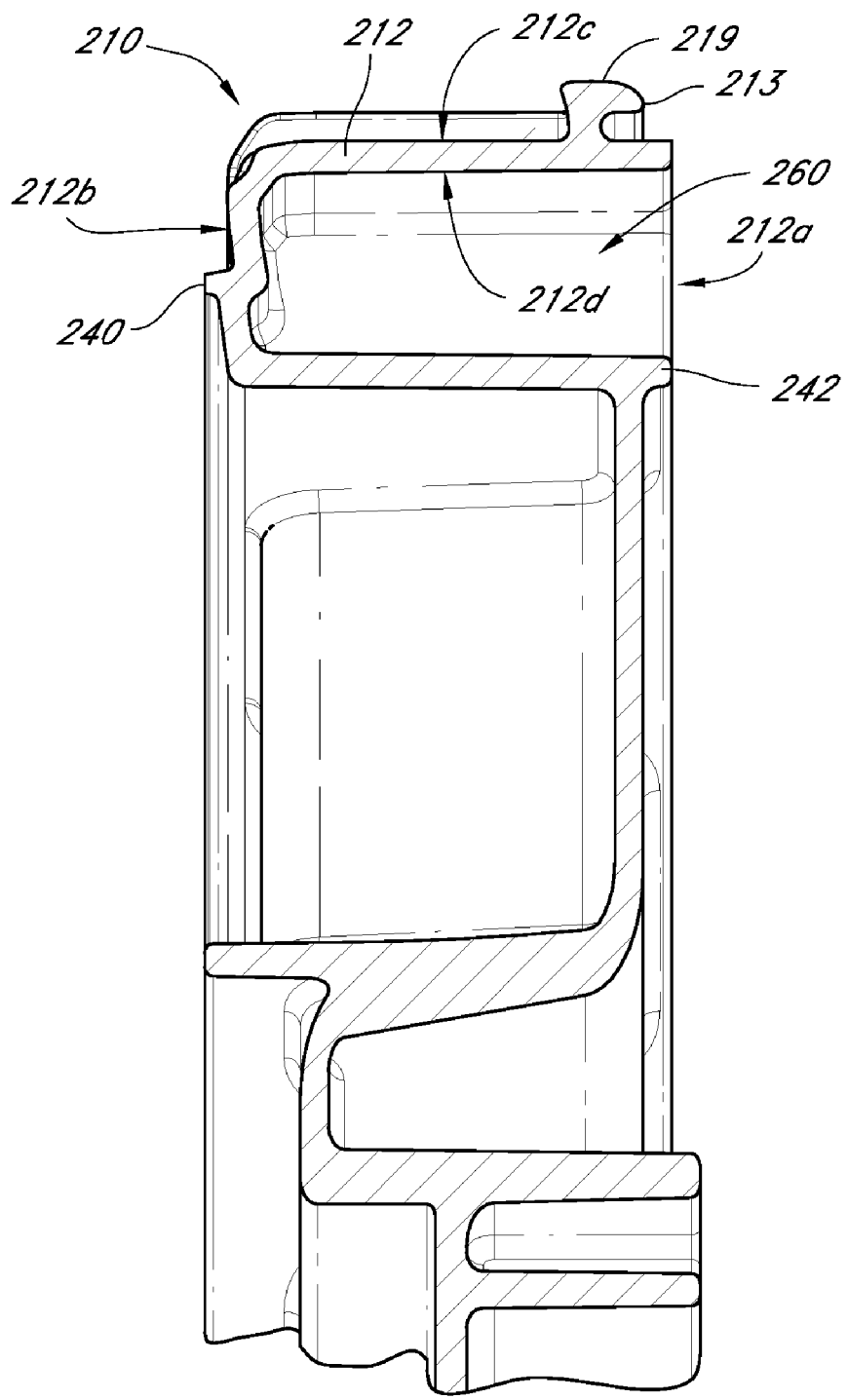
FIG. 2C is a cross-sectional view of an example embodiment of an inner section of the wheel of FIG. 2B taken along the line 2C-2C of FIG. 2B.

FIG. 2B is an exploded perspective view of the wheel 200 of FIG. 2A. The wheel 200 comprises a first assembly 210 and a second assembly 220. The second assembly 220 comprises a material different from that of the first assembly 210. The first assembly 210 comprises a rim 212 and a hub 214. As illustrated in FIG. 2C, a cross-section of the rim 212 has a first side 212a, a second side 212b generally opposite the first side 212a, a ground-facing surface 212c, and a hub-facing surface 212d. The second assembly 220 generally forms a ground-contacting surface of the wheel 200. The second assembly 220 is mechanically coupled through the rim 212 at the first and second sides 212a, 212b of the rim. The second assembly 220 at least partially covers the ground-facing surface 212c of the rim 212. The second assembly 220 extends below (e.g., radially inward of) the hub-facing surface 212d of the rim 212. The hub-facing surface 212d of the rim 212 is at least partially devoid (e.g., generally devoid (e.g., more uncovered than covered), substantially devoid (e.g., almost completely devoid), completely devoid) of the material of the second assembly 220.

In some embodiments, the inner part 210 of the wheel 200 may be injection-molded, blow molded, rotational molded, compression molded, etc. In certain embodiments in which the wheel 200 is injection-molded, injection-molding includes coupling a male mold and a female mold, and injecting molten material therebetween. After the material has sufficiently hardened, the inner part 210 may be removed from one or more of the molds, or the inner part 210 may be moved to a different mold. In some embodiments, the inner part 210 and the outer part 220 may be made in the same mold and machine without movement of the inner part 210. In certain embodiments, the rim 212 and the hub 214 are integrally formed during the injection molding process to form a unitary piece. In some embodiments, the hub 214 comprises corrugated surfaces and/or generally hollow features 260 that can reduce the amount of material used in creation of the inner part 210, but also provide strength by creating certain shapes (e.g., as illustrated in FIG. 2C). In some embodiments, optional features of the rim 212 (e.g., generally hollow features, apertures, ribs, flanges, etc.) are formed during the injection molding process. In embodiments in which the generally hollow features 260 are formed during the injection molding process, the generally hollow features 260 may be "cored out" from the inside of the wheel 200 and/or the outside of the wheel 200. In some embodiments, the inner part 210 comprises a first material such as plastic (e.g., polypropylene, HDPE, ABS, etc.) or metal. In some environments (e.g., cold weather), HDPE exhibits better performance than polypropylene.

The outer part 220 is mechanically coupled to the inner part 210 through the rim 212. In some embodiments, the outer part 220 may be injection-molded, compression molded, etc. As described above, injection-molding involves formation of an element between a male mold and a female mold. In certain such embodiments, the inner part 210 is placed between the male mold and the female mold, and the outer part 220 fills the spaces between the male mold, the female mold, and the inner part 210. In embodiments in which the inner part 210 is also injection-molded, the material of the inner part 210 preferably cools enough that the material of the outer part 220 does not mix therewith. In some embodiments, molding the outer part 220 can occur in the same mold as molding the inner part 210 or can occur in a different mold. In some embodiments, molding the outer part 220 can occur on the same machine as molding the inner part 210 or can occur on a different machine. In some embodiments, molding the outer part 220 can use the same platens as molding the inner part 210 or can use different platens. In certain embodiments, tread lines 224 or other features of the outer part 220 may be integrally formed during the molding process. In some embodiments, the outer part 220 comprises a second material such as rubber or a rubber-like material (e.g., TPE, TPU). In embodiments in which the first assembly 210 comprises polypropylene and the second material comprises TPE or TPU, the second assembly 220 may be both chemically and mechanically coupled to the first assembly 210. Other combinations of materials may also produce a combination chemical-mechanical bond. In certain embodiments, cooling of the material of the outer part 220 may form a tight fit around the inner part 210. In certain embodiments in which the outer portion 220 comprises TPE or TPU, it may be advantageous to reduce the amount of the second material used, for example to reduce costs of manufacturing the wheel 200. Example structures that can reduce the second material used in the outer part 220 but that enjoy the appearance of a wide tread 220 are described below. The thickness of the outer part 220 between the ground-facing surface 212c of the inner part 210 may be selected based factors such as, but not limited to, intended use, material cost, and shape of the rim 212.

In the embodiment illustrated in FIG. 2A, the outer part 220 comprises a ledged end proximate to or adjacent to a rim of the inner part 210. A ledged end may help to reduce (e.g., prevent) tampering and/or help to reduce (e.g., prevent) foreign objects from being lodged (e.g., wedged) between the inner part 210 and the outer part 220. In some embodiments, such a foreign object could weaken the bond between the inner part 210 and the outer part 220. A ledged end of the outer part 220 is also possible in embodiments in which the inner part 210 does not comprise a rim (e.g., terminating at a width $t_o$ or $t_i$). In certain alternative embodiments, the outer part 220 comprises a tapered end proximate to or adjacent to a rim of the inner part 210. A tapered end may reduce the amount of the second material used. A tapered end of the outer part 220 is also possible in embodiments in which the inner part 210 does not comprise a rim (e.g., terminating at a width $t_o$ or $t_i$). Combinations of ends of the outer part 220 are also possible (e.g., a tapered end on the inside of the wheel 200 and a ledged end on the outside of the wheel 200, a tapered end on the outside of the wheel 200 and a ledged end on the inside of the wheel 200).

Figure 3A:
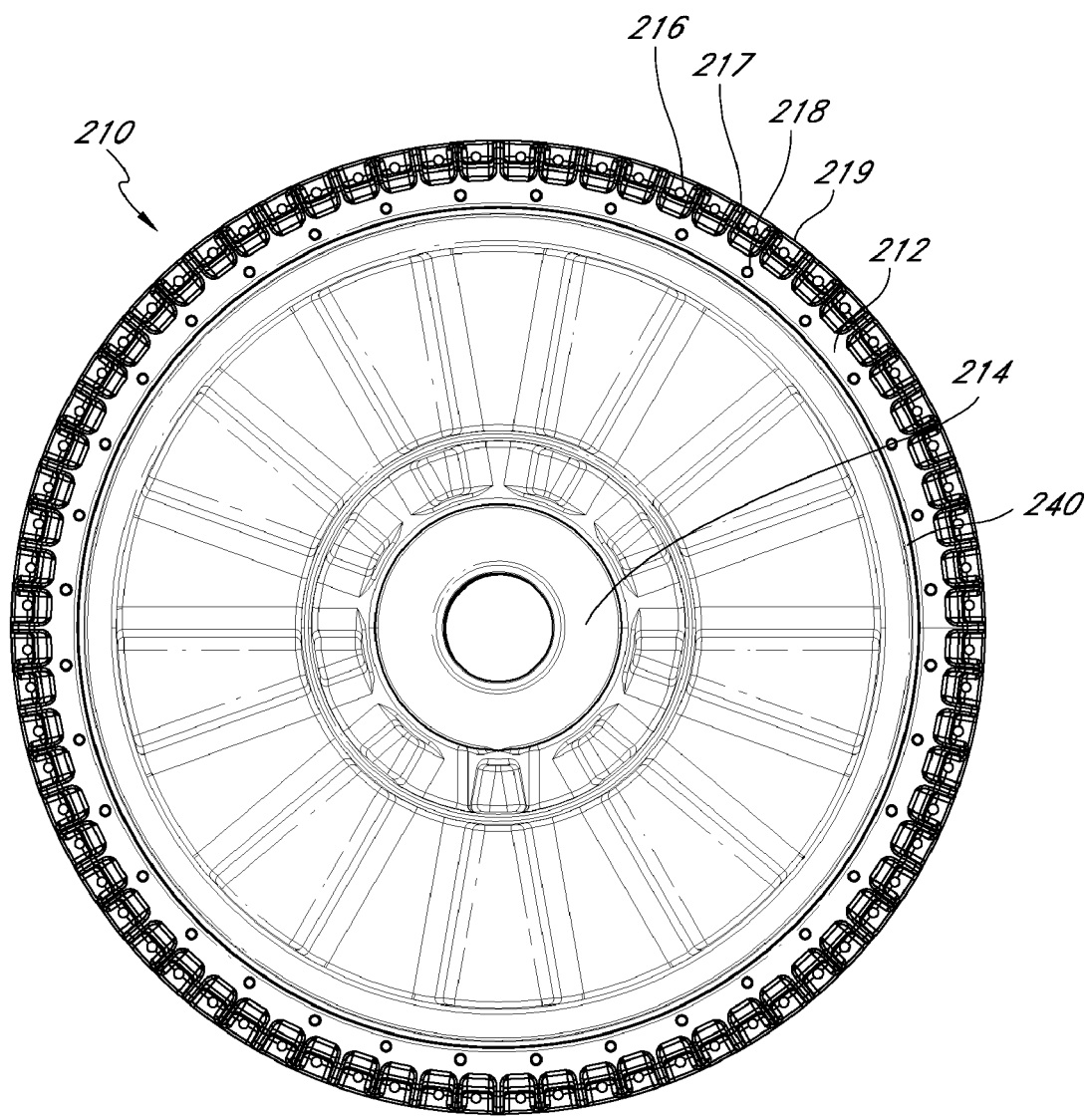
FIG. 3A is a front elevational view of an example embodiment of an inner portion of the wheel of FIG. 2B.

In some embodiments, the rim 212 of the inner section 210 comprises features that allow the second section 220 to be mechanically coupled to the first section 210. For example, in the embodiment illustrated in FIG. 3A, the rim 212 comprises a first plurality of apertures 216 through the first side 212a of the rim 212, a second plurality of apertures 218 through the second side 212b of the rim 212, a flange 219 proximate to the first side 212a of the rim 212, and a plurality of ribs 217 transverse (e.g., orthogonal, generally perpendicular) to the flange 219. The apertures 216 may have any quantity, position, spacing, and shape that can effect an acceptable fit of the outer section 220 to the first side 212a of the rim 212, and the apertures 218 may have any quantity, position, spacing, and shape that can effect an acceptable fit of the outer section 220 to the second side 212b of the rim 212. In certain embodiments, the rim 212 comprises fewer apertures 218 than apertures 216. In some embodiments, the first plurality of apertures 216 is radially offset from the second plurality of apertures 218. The ribs 217 may have different radial and annular thicknesses (e.g., alternating tall and wide ribs and short and thin ribs). In embodiments comprising a flange 219 and ribs 217, the ribs 217 may reduce distortion of the flange 219 and the flange 219 may add support to, and reduce deflection of, the ribs 217. Referring again to FIG. 2C, in some embodiments, the flange 219 includes a lip 213 extending towards the first side 212a of the rim 212. In some embodiments, the lip 213 may reduce roll-off of the second section 220 during lateral shifting that may occur with non-mechanically or solely chemically bonded outer sections.

Figure 4A:
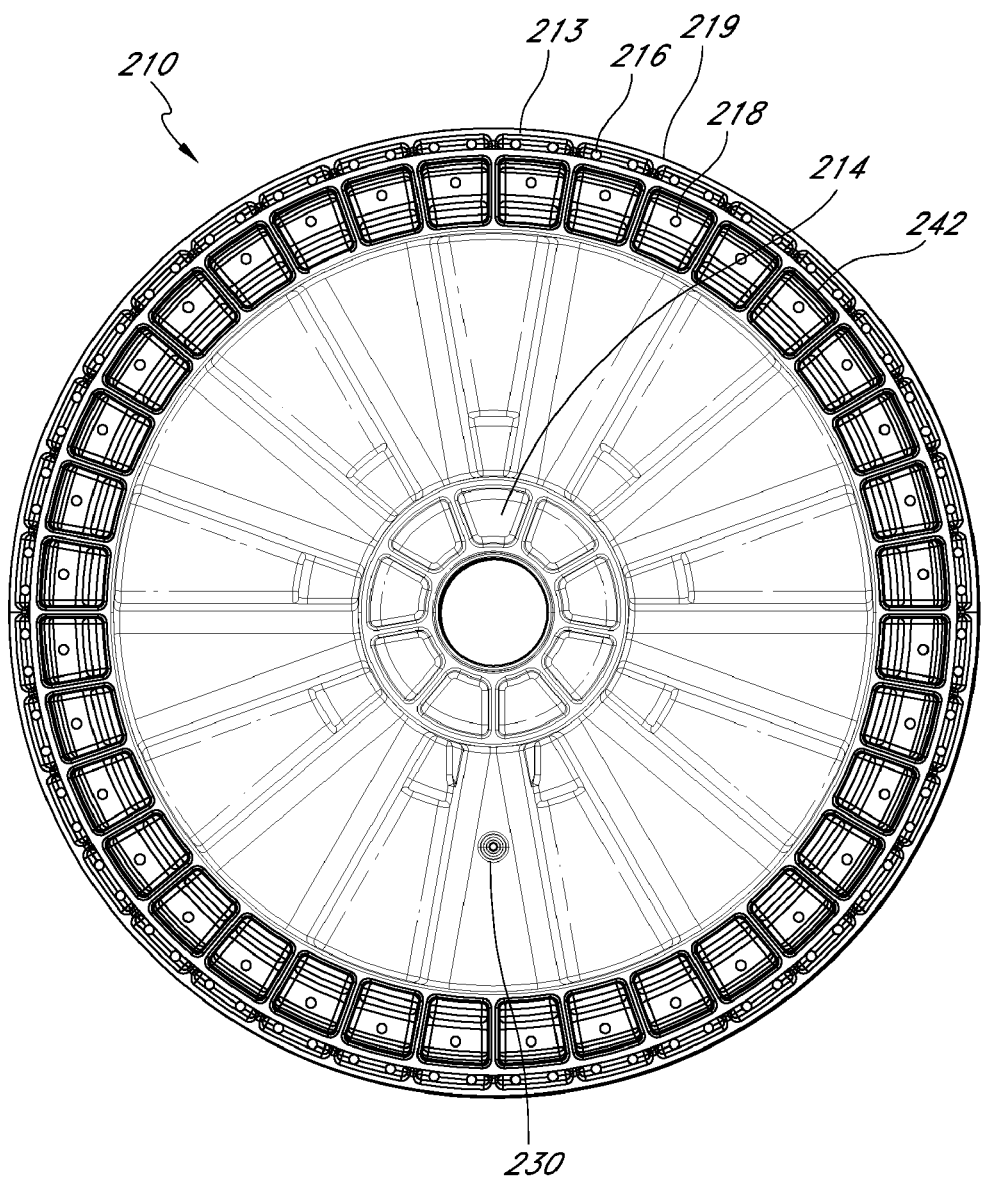
FIG. 4A is a back elevational view of an example embodiment of an inner portion of the wheel of FIG. 2B.

If a wheel is dropped on a hard object or subjected to a static or dynamic heavy load, the impact point may be prone to deflection (i.e., movement from an original position due to stress). If the rim includes hollow features, for example, the impact point could collapse into the spaces such that the wheel may lose its roundness, particularly if the rim 212 comprises generally hollow features 260. Increasing the amount of material in and to the surfaces of the hollow features 260 may add weight to the wheel and increase costs without reducing deflection. In some embodiments, a flange 219 that is disposed radially outward of the generally hollow features 260 can reinforce the rim 212, thereby adding strength to the wheel 200 and reducing (e.g., minimizing, eliminating) deflection and maintaining the roundness of the wheel 200. In some embodiments, a flange 219 that is disposed radially outward of the generally hollow features 260 can utilize less material than would be used by increasing the amount of material in and around the surfaces of the hollow features 260. The flange 219 may also reinforce the rim 212 of wheels 200 in which the rim 212 does not comprise the generally hollow features 260. In certain embodiments, the rim 212 comprises a plurality of ribs 217 generally transverse to the flange 219. In certain embodiments, the flange 219 further comprises a lip 213 extending towards a side (e.g., the inside, as illustrated in FIG. 2A; the outside) of the rim 212. In certain such embodiments, the rim 202 may comprise ribs 217 or other ribs or riblets disposed below (i.e., radially inward of) the lip 213 to add structural support to the lip 213 (FIG. 4A). In certain embodiments, the flange 219, the lip 213, and/or riblets thereunder can reduce (e.g., minimize, eliminate) deflection of the wheel 200, which can reduce deformation under impact and heavy loads, leading to a wheel 200 that can remain a truer circular shape over a long term. The material used for the flange 219, the lip 213, and/or the riblets thereunder, may also serve a mechanical coupling function as described herein.

Figure 3B:
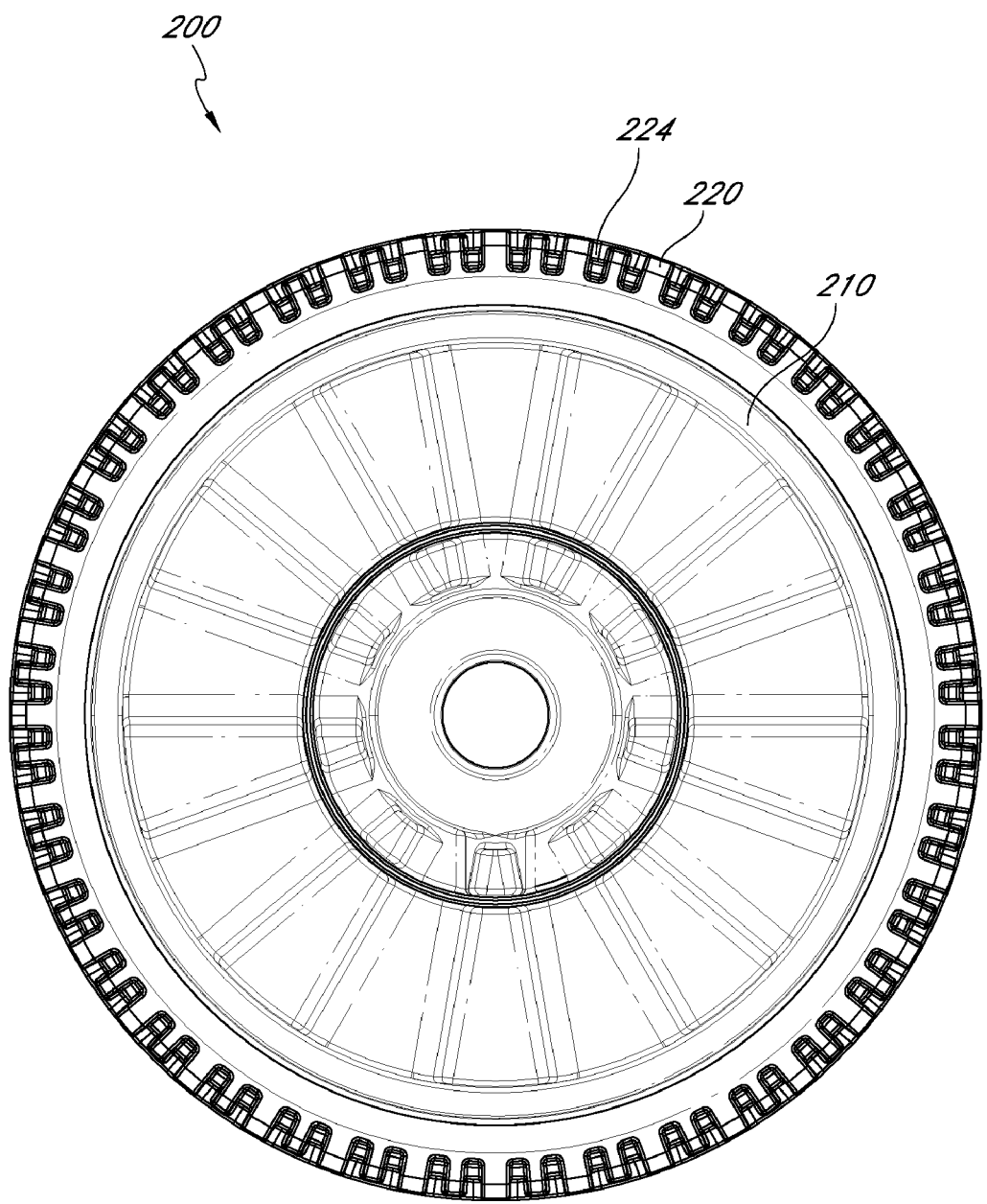
FIG. 3B is a front elevational view of the wheel of FIG. 2A.

FIG. 3B illustrates the wheel 200 after an outer section 220 has been mechanically coupled to the inner section 210. In certain embodiments, the outer section 220 may also be chemically bonded to the inner section 210. In the front elevational view, the pluralities of apertures 216, 218 are not visible because the second material of the second section 220 covers or occupies the space of the pluralities of apertures 216, 218. In certain such embodiments, the wheel 200 has a clean appearance (e.g., not being evident how the outer section 220 is coupled to the inner section 210), which may reduce the propensity for tampering as well as being aesthetically pleasing. In some embodiments, the material of the outer section 220 at least partially covers the ground-facing surface 212c of the rim 212 of the inner section 210. In some embodiments, the outer section 220 completely covers the ground-facing surface 212c of the rim 212 of the inner section 210. In some embodiments, the outer section 220 completely covers the ribs 217 and flange 219 of the rim 212 of the inner section 210.

In some embodiments, the outer section 220 comprises a plurality of recesses 224, thereby creating a tire-like appearance (e.g., the appearance of a pneumatic tire, the appearance of a solid tire). In embodiments in which the rim 212 comprises ribs 217, the second assembly 220 may be molded around the ribs 217 to produce the recesses 224. In embodiments in which the rim 212 does not comprise ribs 217, the second assembly 220 may be molded to produce the recesses 224 (e.g., having a core of the second material rather than having a rib core). In some embodiments, the recesses 224 help the wheel 200 to grip the ground surface, for example by adapting to varying ground conditions, by channeling water, etc.

FIG. 4A illustrates a back elevational view of the inner piece 210 of the wheel 200. As described above, the rim 212 comprises a plurality of apertures 216, a flange 219, and a plurality of apertures 218. In some embodiments in which the hub 214 is configured to accept a sleeve or hub assembly as described above, the inner piece 210 comprises a tool passageway configured to allow a user that wishes to separate the wheel 200 from an axle 150 to insert a tool to manipulate a retaining member (e.g., an axle-retaining sleeve). In certain such embodiments, the inner piece 210 comprises a membrane or "puncture skin" 230 at least partially covering the tool passageway. The membrane 230 is preferably thin enough to be punctured by the tool prior to engagement with the retaining member (e.g., about 0.01 inch thick). The membrane 230 may provide evidence of tampering with the wheel 200. The membrane 230 may also disguise access to the retaining member, such that only a person having knowledge of the retaining member is able to detach the wheel 200 from the axle 150 without damaging the wheel 200. The membrane 230 may be flush with a spoke 232 of the hub 214. The edges of the tool passageway may be raised with respect to a spoke 232 to identify the tool passageway if covered by a membrane 230.

Figure 4B:
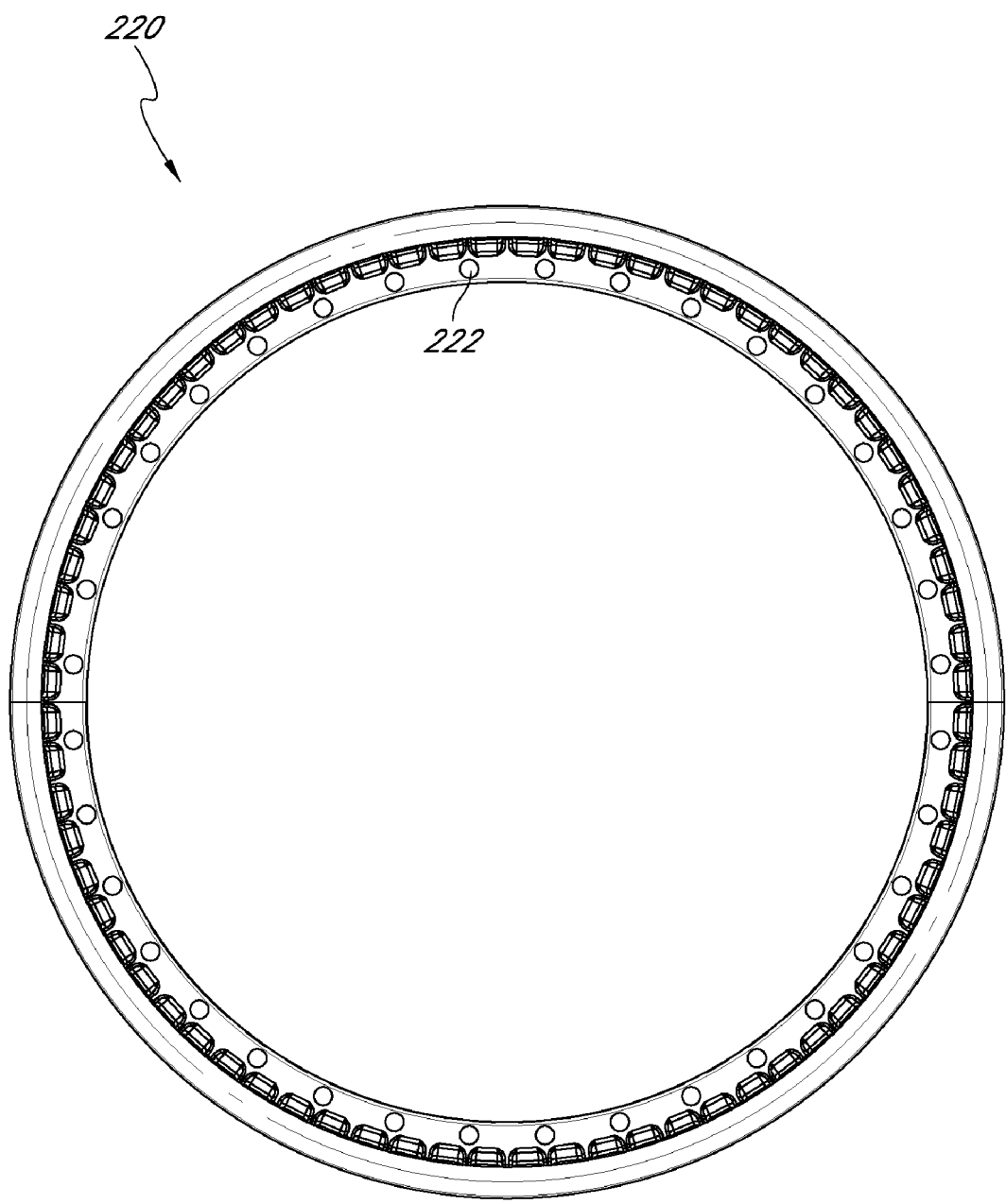
FIG. 4B is a back elevational view of an example embodiment of an outer portion of the wheel of FIG. 2B.
Figure 4C:
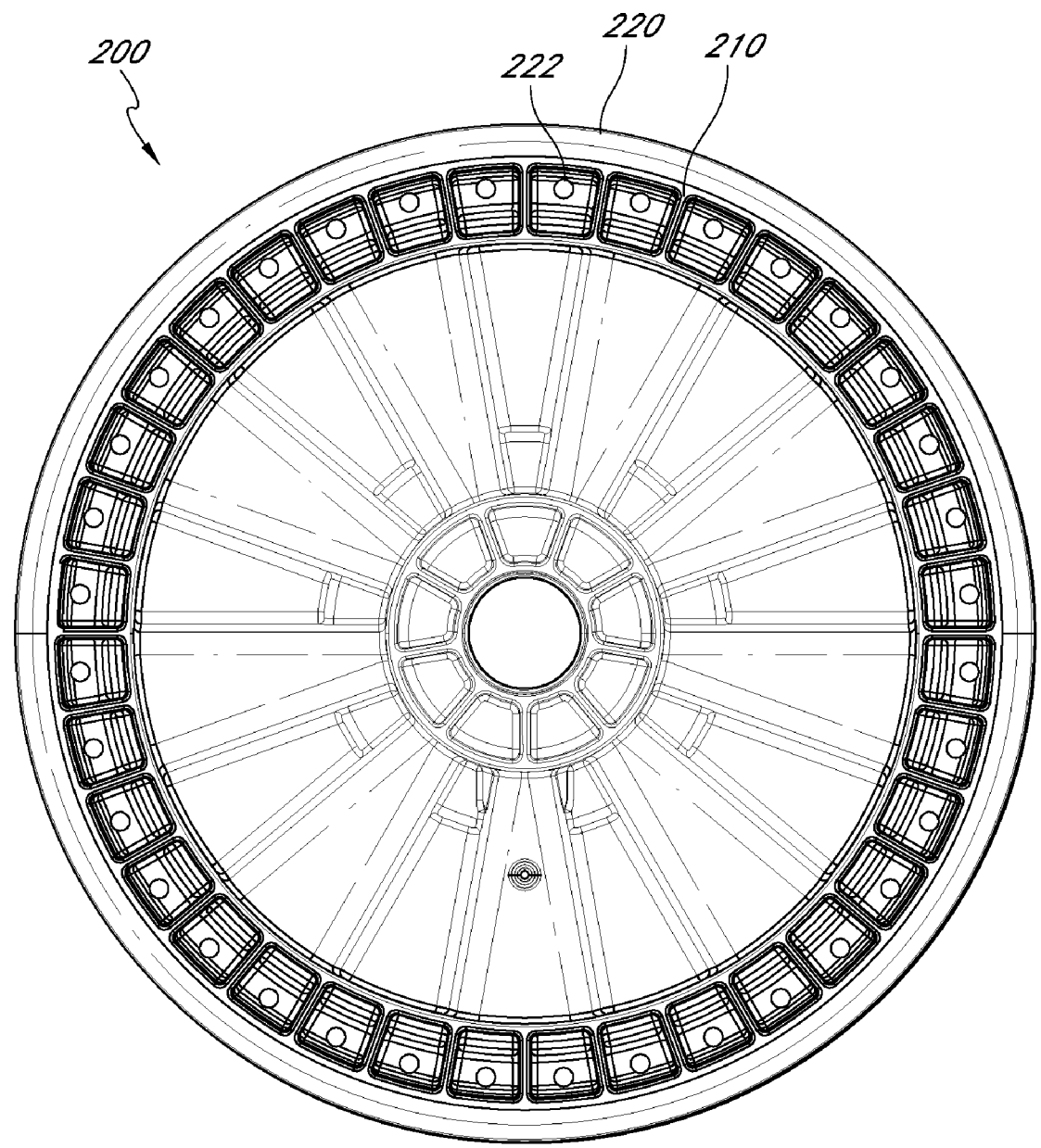
FIG. 4C is a back elevational view of the wheel of FIG. 2A.

FIG. 4B is a back elevational view of the outer piece 220 that may be mechanically coupled to the inner piece 210 (e.g., by injection molding) to form the wheel 200. In certain embodiments, the outer piece 220 may also be chemically bonded to the inner piece 210. The outer piece 220 comprises a plurality of buttons (or knobs, protrusions, rivets, heads, etc.) 222 that extend through the plurality of apertures 218 of the second side 212b of the rim 212 of the inner piece 210. FIG. 4C illustrates the wheel 200 comprising the outer piece 220 and the inner piece 210. In embodiments in which the outer piece 220 is injection molded, the molten second material flows or weaves through the apertures 218 until contacting a mold, after which the molten second material flows transverse to the apertures 218 on the inner portion of the rim 212. The buttons 222 thus extend through the second side 212b of the inner piece 210 to mechanically couple the second piece 220 to the first piece 210. Although not visible in this back elevational view, the outer piece 220 is also mechanically coupled to the rim 212 on the opposite first side 212a of the rim 212.

Figure 5A:
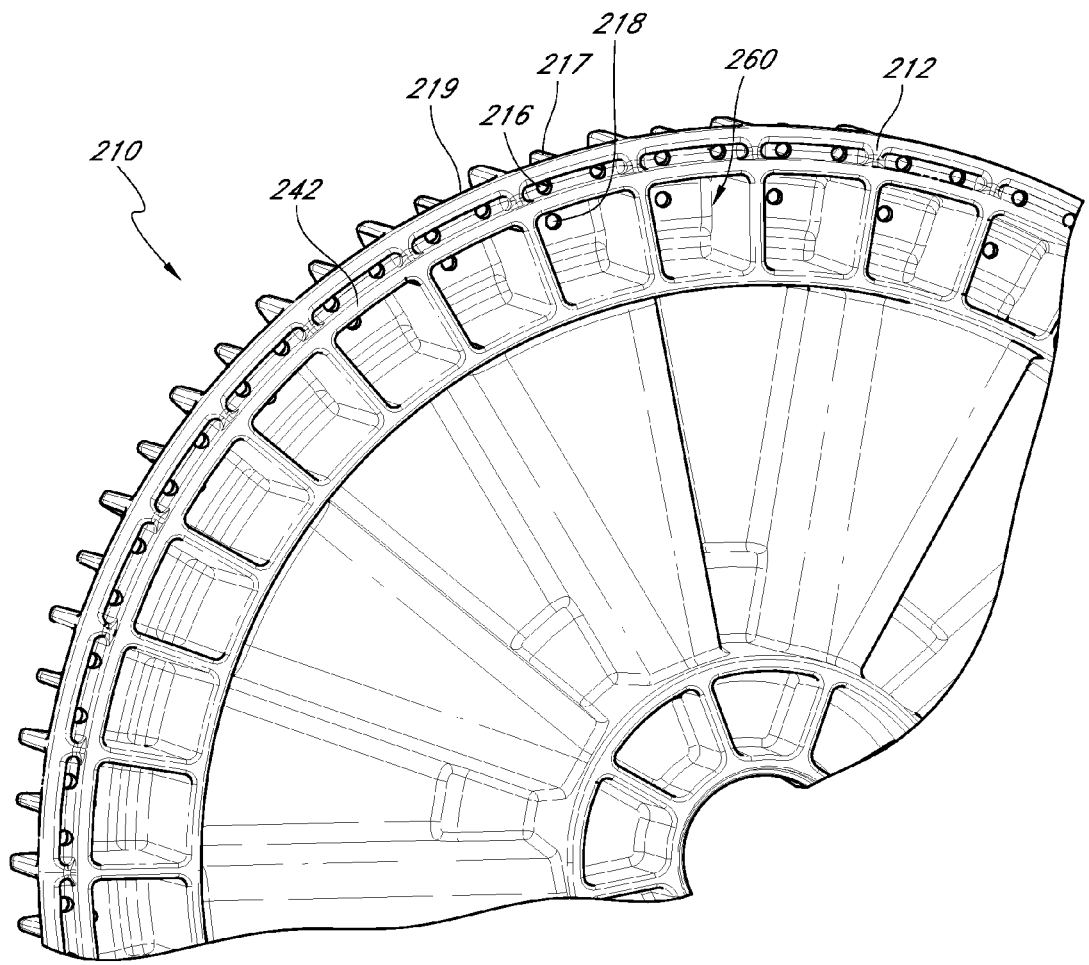
FIG. 5A is a back/top perspective view of a portion of an example embodiment of an inner portion of the wheel of FIG. 2B.
Figure 5B:
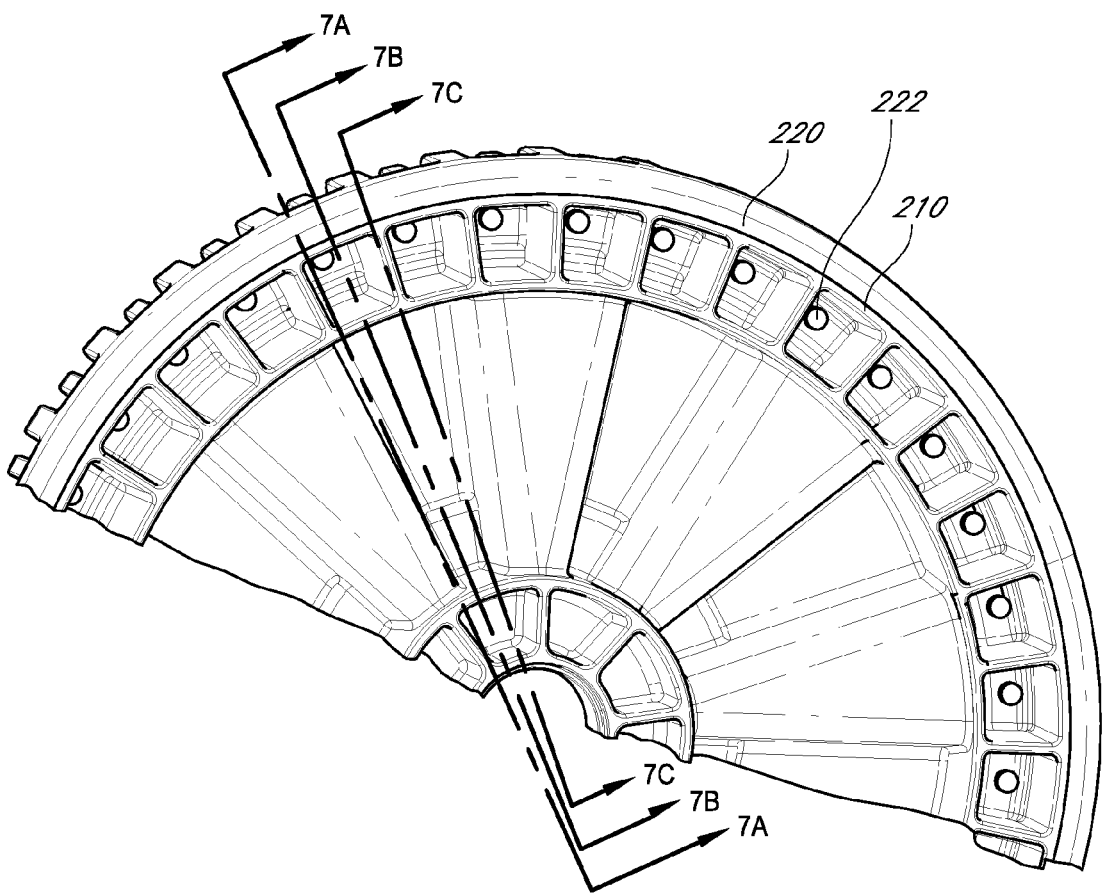
FIG. 5B is a back/top perspective view of a portion of the wheel of FIG. 2A.

FIG. 5A illustrates a portion of the inner section 210 of the wheel 200 that illustrates the optional features of the rim 212. The plurality of apertures 216 extend through the flange 219 between the ribs 217. The second assembly 220 may thereby be mechanically coupled through the rim 212 at the first side 212a of the rim 212 between at least some of the ribs 217. FIG. 5B illustrates the wheel 200 with the outer section 220 mechanically coupled to the inner section 210. As described above, a plurality of buttons 222 extend through the plurality of apertures 218, to thereby mechanically couple the outer section 220 to the inner section 210 on the second side 212b of the rim 212. FIG. 5B further illustrates that the outer section 220 may substantially cover (e.g., overlap) the flange 219 and the ribs 217. In embodiments in which the flange 219 comprises a lip 213, the outer section 220 may at least partially overlap the lip 213. The outer section 220 may also be disposed through each of the plurality of apertures 216 to mechanically couple the outer section 220 to the inner section 210 on the first side 212a of the rim 212.

Figure 6A:
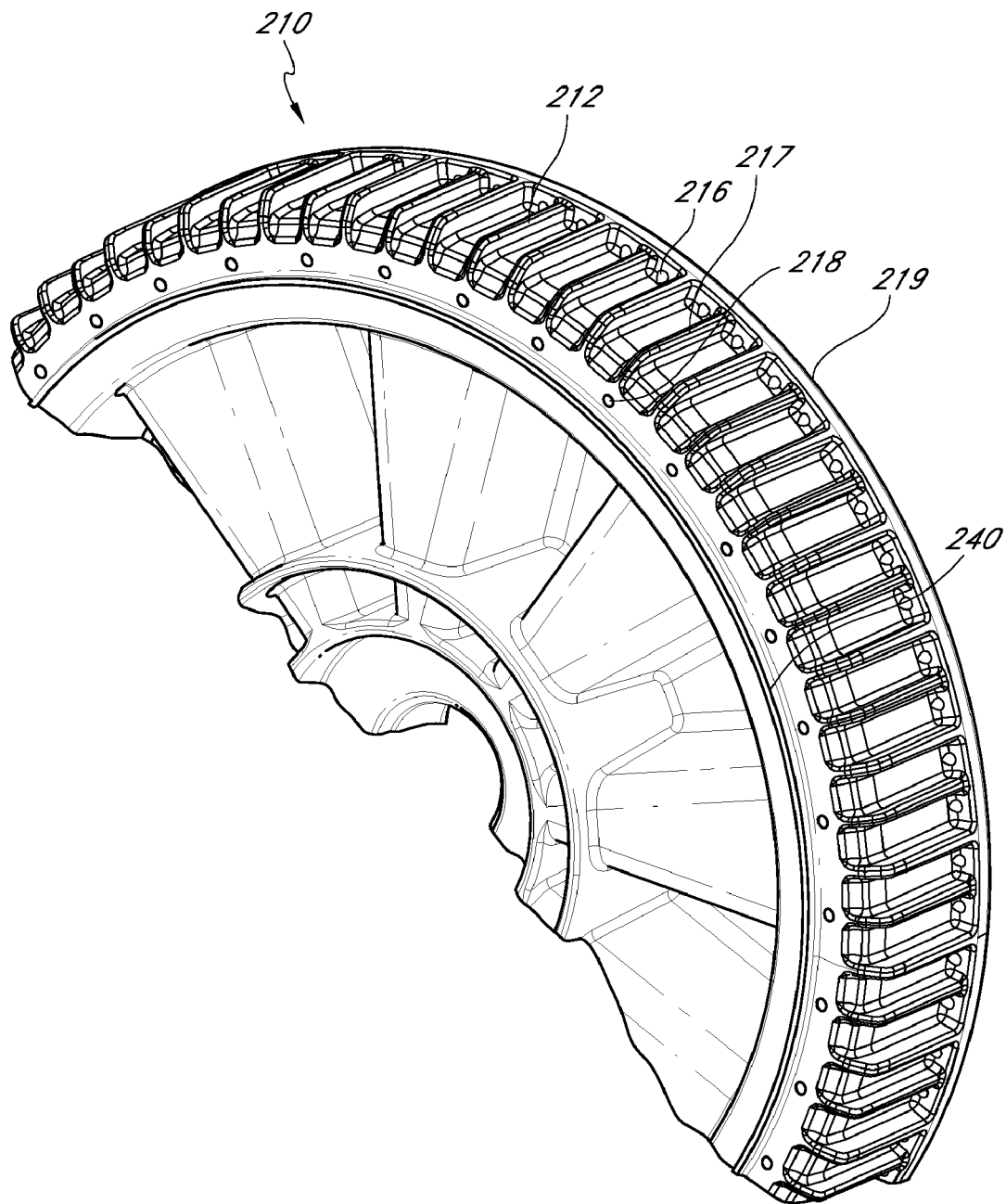
FIG. 6A is a front/top perspective view of a portion of an example embodiment of an inner portion of the wheel of FIG. 2B.

FIG. 6A illustrates another portion of the inner section 210 of the wheel 200 that illustrates the optional features of the rim 212. The plurality of apertures 216 extend through the flange 219 between the ribs 217. The apertures 218 may be disposed below (e.g., radially inward of) at least some of the ribs 217. The second assembly 220 may thereby be mechanically coupled through the rim 212 at the second side 212b of the rim 212 radially inward from the ribs 217.

Figure 6B:
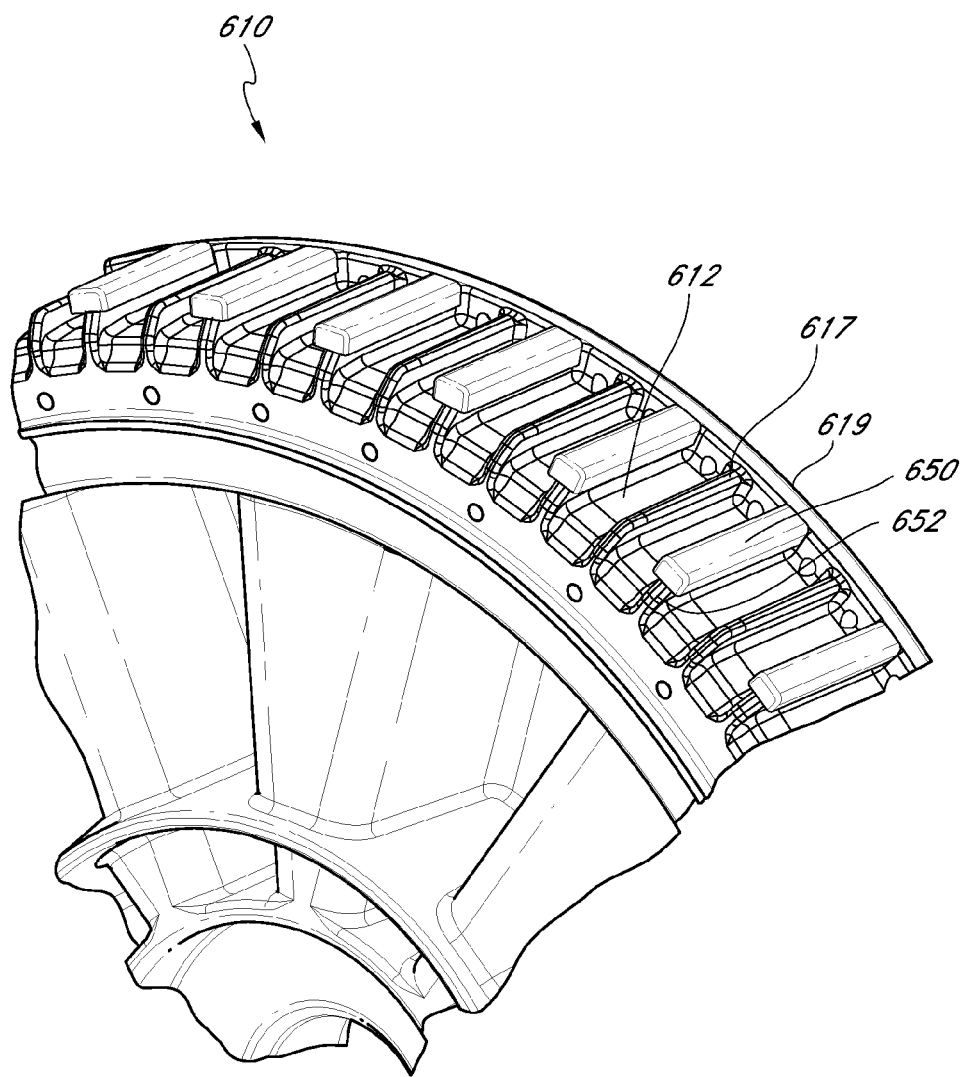
FIG. 6B is a front/top perspective view of a portion of another example embodiment of an inner portion of a wheel.

FIG. 6B illustrates a portion of another example embodiment of the inner section 610 of the wheel 200 that illustrates additional optional features of the rim 612. The rim 612 includes a plurality of partially annular ribs 650 transverse (e.g., substantially orthogonal, generally perpendicular) to the flange 619 and transverse (e.g., substantially orthogonal, generally perpendicular) to the ribs 652. In some embodiments, a narrow end of the partially annular ribs 650 abuts the flange 619 and a generally horizontal surface of the partially annular ribs 650 abuts a generally vertical surface of the ribs 652 (or vice versa), as the features appear in a localized area, although the partially annular ribs 650 may include some curvature. The second material of the outer section 220 may be confined between the partially annular ribs 650 and the ground-facing surface 212c to aid in retaining the outer section 220 to the inner section 612, thereby forming a rib undercut feature. The rib undercut features of such embodiments are T-shaped. Other shapes that can cause undercut or at least partial confinement of the outer section 220 are also possible, for example and without limitation, L-shaped, J-shaped or hook-shaped, and arrowhead-shaped. Combinations of undercut feature shapes are also possible. The partially annular ribs 650 may also occupy space, thereby reducing the amount of the second material used. The partially annular ribs 650 may be disposed above some of the ribs 652 and not above others of the ribs 617, for example as illustrated in FIG. 6B. Alternatively, more of the ribs 617, 652 may include an undercut feature (e.g., all of the ribs 617, 652, two-thirds of the ribs 617, 652, etc.) or fewer of the ribs may include an undercut feature (e.g., none of the ribs 617, 652, one-third of the ribs 617, 652, etc.), The width of the partially annular ribs 650 may be selected based on flow properties of the second material (e.g., configured to avoid formation of cavities between the first and second materials due to surface tension at corners).

Figure 6C:
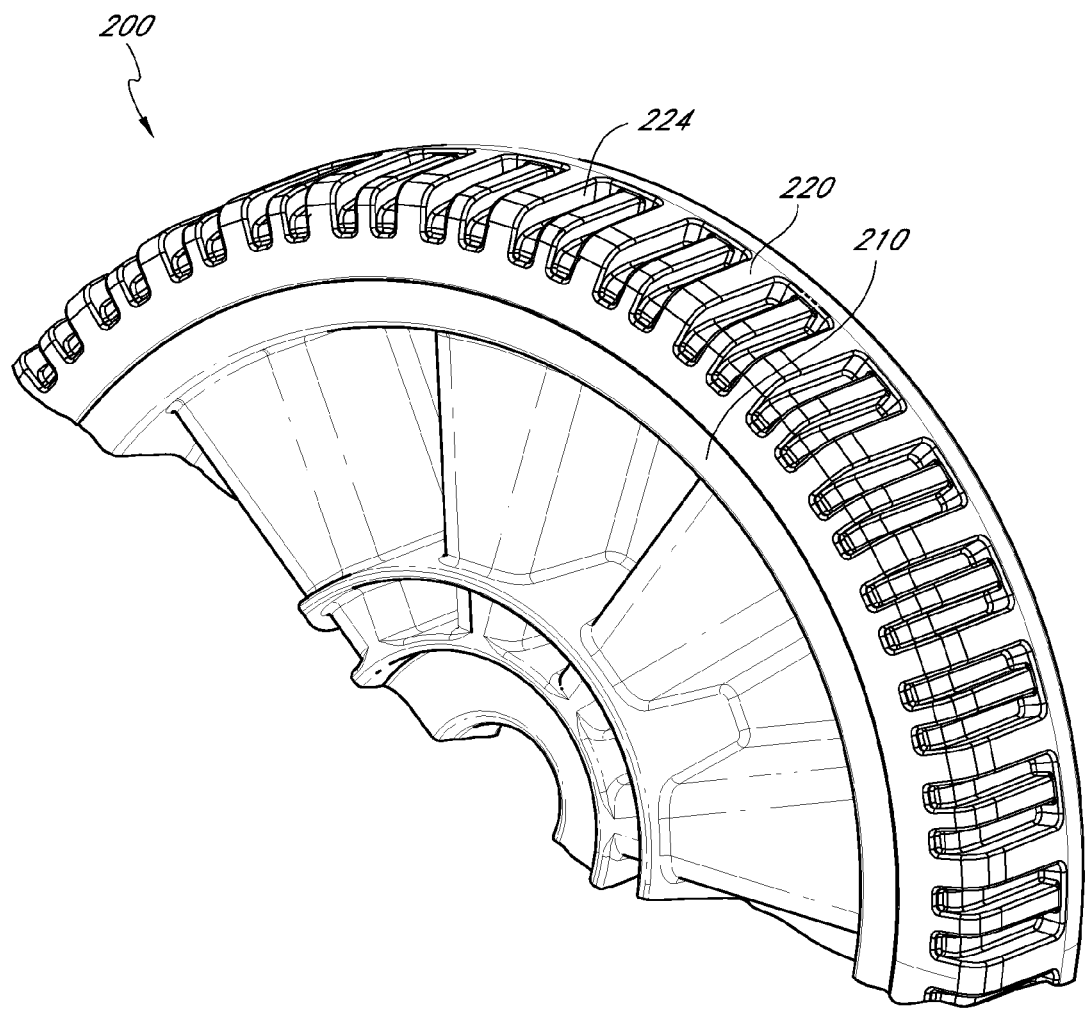
FIG. 6C is a front/top perspective view of portion of an example embodiment of the wheel of FIG. 2A.

FIG. 6C illustrates the wheel 200 with the outer section 220 mechanically coupled to the inner section 210. In certain embodiments, the outer section 220 may also be chemically bonded to the inner section 210. FIG. 6C further illustrates that the outer section 220 may substantially cover (e.g., overlap) the flange 219 and the ribs 217. The outer section 220 may also be disposed through each of the plurality of apertures 216 to mechanically couple the outer section 220 to the inner section 210 on the first side 212a of the rim 212.

Figure 7A:
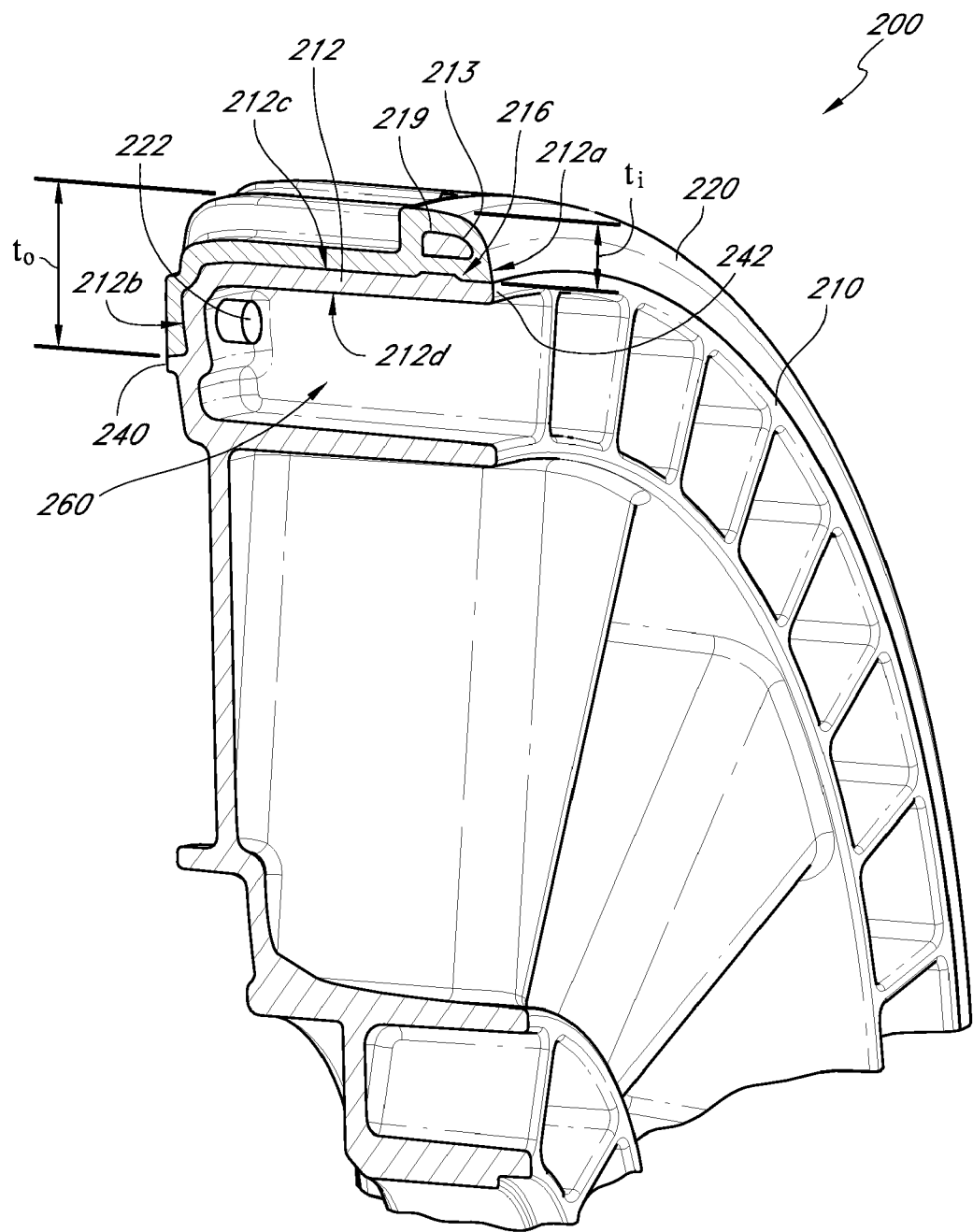
FIG. 7A is a cross-sectional view of the wheel of FIG. 2A taken along the line 7A-7A of FIG. 5B.
Figure 7B:
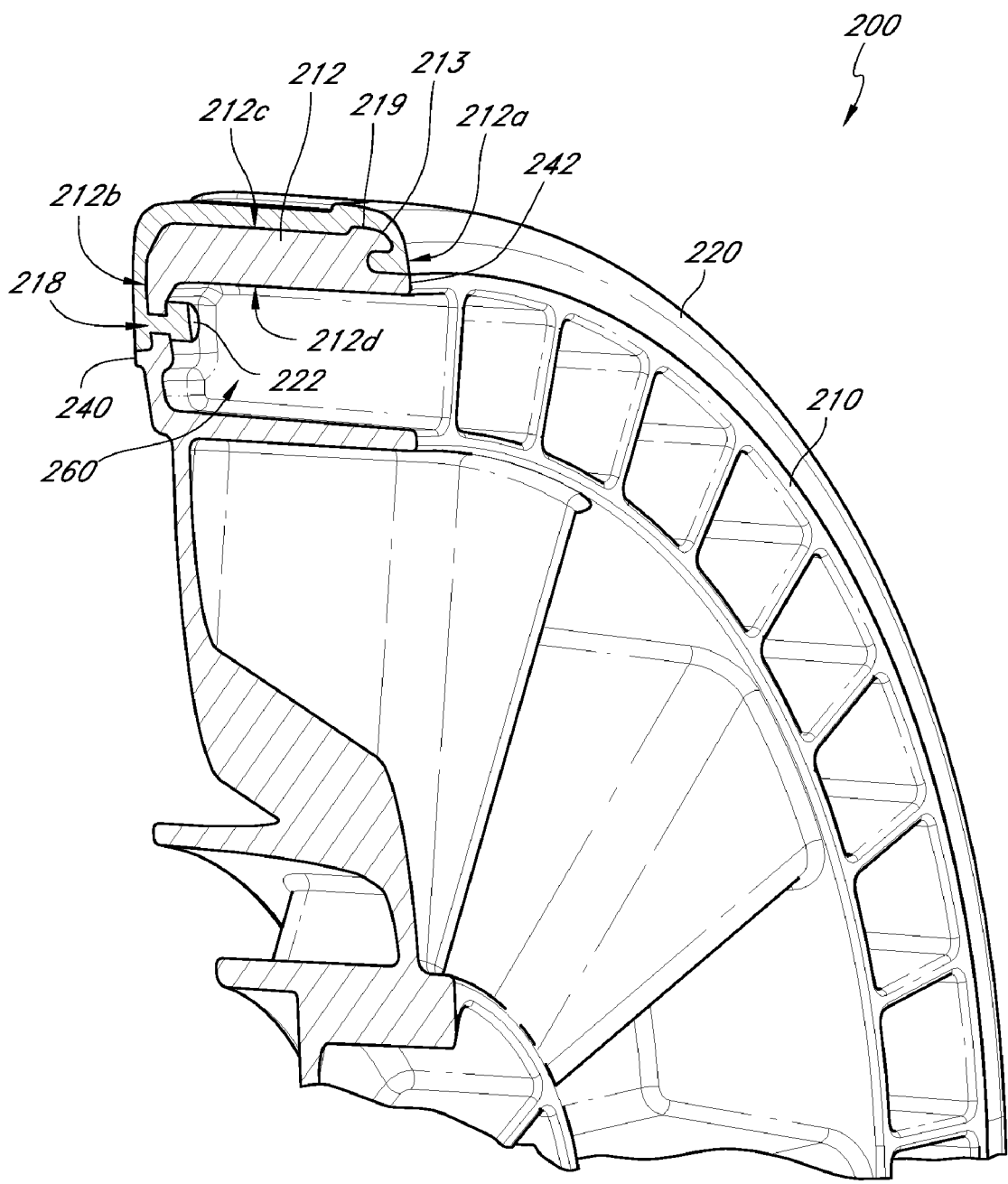
FIG. 7B is a cross-sectional view of the wheel of FIG. 2A taken along the line 7B-7B of FIG. 5B.
Figure 7C:
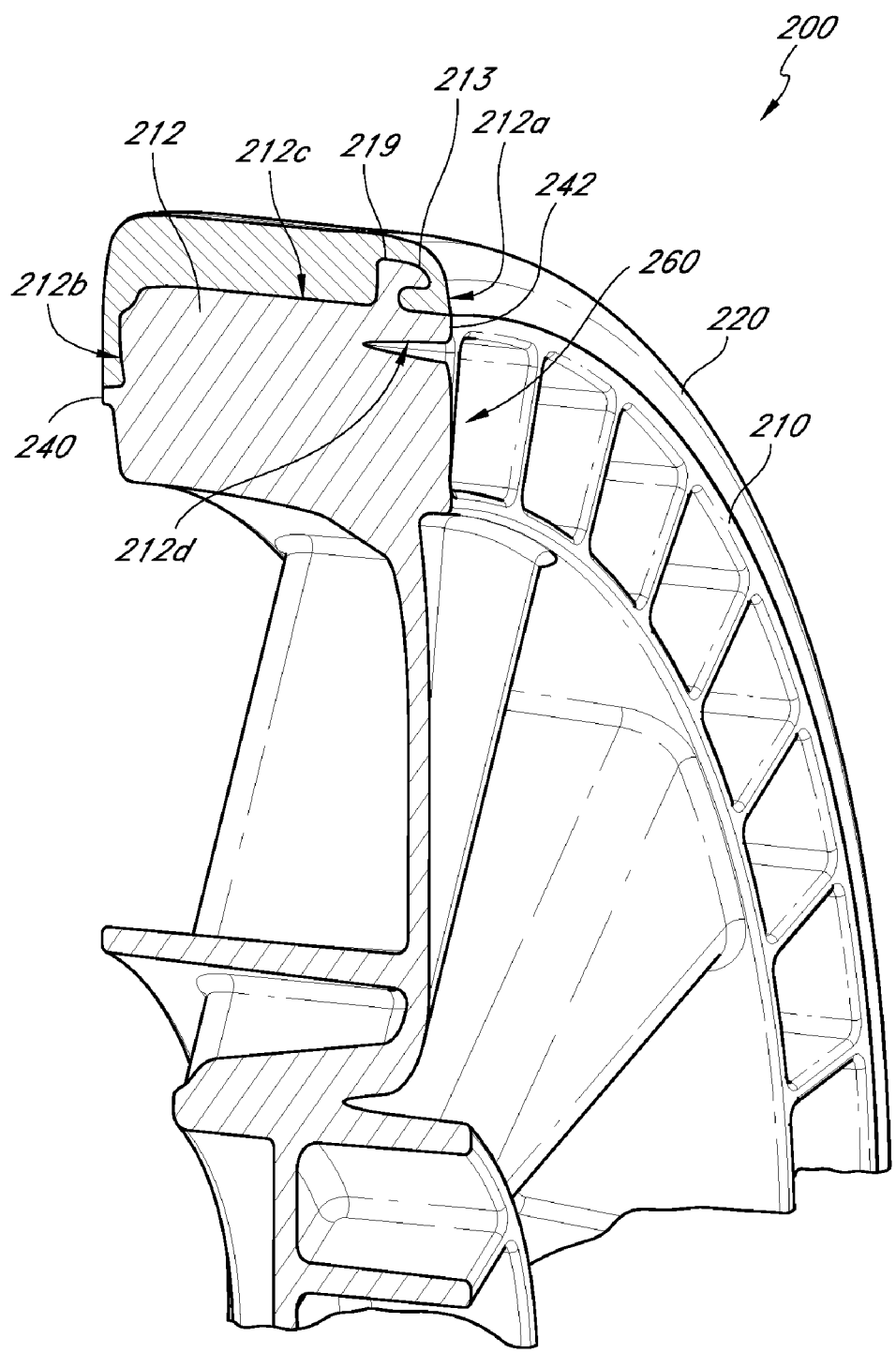
FIG. 7C is a cross-sectional view of the wheel of FIG. 2A taken along the line 7C-7C of FIG. 5B.

FIGS. 7A-7C illustrate cross-sectional views of the wheel 200. The cross-section of FIG. 7A, taken along the line 7A-7A of FIG. 5B, is through an aperture 216. The cross-section of FIG. 7B, taken along the line 7B-7B of FIG. 5B, is through a rib 217 and an aperture 218. The cross-section of FIG. 7C, taken along the line 7C-7C of FIG. 5B, is through a portion of the rim 212 not comprising an aperture 216, 218 or a rib 217. Each cross section of the illustrated embodiment of the wheel 200 includes a rim 212 including the flange 219 and the lip 213. Each cross-section of the rim 212 of the first assembly 210 has a first side 212a, a second side 212b opposite the first side 212a, a ground-facing surface 212c, and a hub-facing surface 212d. The second assembly 220 is mechanically coupled through the rim 212 at the first side 212a of the rim 212 and the second side 212b of the rim 212. The second assembly 220 at least partially covers the ground-facing surface 212c of the rim 212. The second assembly 220 extends below (e.g., radially inward of) the hub-facing surface 212d of the rim 212. The hub-facing surface 212d of the rim 212 is generally devoid (e.g., substantially devoid, completely devoid as illustrated in FIGS. 7A-7C) of the second assembly 220. The second assembly 220 weaves through the apertures 216 on the first side 212a of the rim 212, as illustrated in FIG. 7A, and the second assembly 220 is further secured to the first side 212a by overlapping the lip 213, as illustrated in FIGS. 7B and 7C. The second assembly 220 also weaves through the apertures 218 on the second side 212b of the rim 212, as illustrated in FIG. 7C.

In some embodiments, the radial width $t_o$ of the second assembly 220 at the second side 212b of the rim 212 is greater than a radial width $t_i$ of the second assembly 220 at the first side 212a of the rim 212. This provides the visual appearance of a thick tread 220, but utilizes a relatively small amount of the second material. Reduction of the amount of the second assembly 220 may reduce the costs of manufacturing the wheel while still remaining functional and commercially viable. For example, while consumers generally prefer a thick-appearing tire to a thin-appearing tire, some applications such as refuse carts generally do not require thick tires (e.g., because the travel distance is low, because the contents are not valued, etc.). In some embodiments, a ratio of weight of the second assembly 220 to weight of the first assembly 210 is less than about 0.5 to 1 (i.e., 0.5:1, 0.5/1). For example, in an embodiment in which the first assembly 210 weighs about 1 pound (approximately 454 grams), the second assembly 220 weights less than about 0.5 pounds (approximately 227 grams). In some embodiments, a ratio of weight of the second assembly 220 to weight of the first assembly 210 is less than about 0.4:1, less than about 0.3:1, less than about 0.2:1, less than about 0.1:1, less than about 0.05:1, less than about 0.01:1, or less than about 0.001:1. In certain embodiments, a ratio of weight of the second assembly 220 to weight of the first assembly 210 is between about 0.3:1 and about 0.4:1. For example, in an embodiment in which the first assembly 210 weighs about 1 pound (approximately 454 grams), the second assembly 220 weights between about 0.3 pounds (approximately 136 grams) and about 0.4 pounds (approximately 181 grams) (e.g., about 0.36 pounds (approximately 163 grams)). Such an embodiment may be practical when the first assembly 210 comprises HDPE and the outer section 220 comprises TPE. For another example, in an embodiment in which the first assembly 210 weighs about 1 pound (approximately 454 grams), the second assembly 220 weights between about 0.1 pounds (approximately 45 grams) and about 0.2 pounds (approximately 91 grams) (e.g., about 0.18 pounds (approximately 82 grams)). Such an embodiment may be practical when the first assembly 210 comprises HDPE and the outer section 220 comprises TPU. In certain embodiments, a ratio of weight of the second assembly 220 to weight of the first assembly 210 is between about 0.1:1 and about 0.5:1, between about 0.1:1 and about 0.4:1, or between about 0.001:1 and about 0.1:1. Other ratios are also possible.

In some embodiments, the weight of the second assembly 220 is less than about 30% of the weight of the total weight of the wheel 200. In certain embodiments, the weight of the second assembly 220 is less than about 50%, less than about 40%, less than about 20%, less than about 10%, less than about 1%, or less than about 0.1% of the weight of the total weight of the wheel 200. In some embodiments, the weight of the second assembly 220 is between about 20% and about 30% of the total weight of the wheel 200 (e.g., about 26%). In certain embodiments, the weight of the second material is between about 0.1% and about 50%, between about 1% and about 30%, between about 5% and about 40%, between about 10% and about 30%, or between about between about 23% and about 29% of the total weight of the wheel 200. Other percentages are also possible.

The thickness of the second assembly 220 to the radius of the wheel 200 in combination with the relative weight of the second assembly 220 to the radius of the wheel 200 may also be used to identify a quantity of second assembly 220, regardless of the material or density of the first assembly 210. In some embodiments, a ratio of radial width $t_o$ of the second assembly 220 on the second side 212b of the rim 212 to a radius of the wheel 200 is between about 0.1:1 and about 0.3:1. For example, in an embodiment in which the radius of the wheel 200 is about 5 inches (approximately 0.127 meters), the radial width to of the second assembly 220 on the second side 212b of the rim 212 is between about 0.5 inches (approximately 0.013 meters) and about 1.5 inches (approximately 0.038 meters) (e.g., about 1 inch (approximately 0.025 meters)). In some embodiments, a ratio of radial width $t_o$ of the second assembly 220 on the second side 212b of the rim 212 to a radius of the wheel 200 is between about 0.05:1 and about 0.75:1, between about 0.1:1 and about 0.5:1, or between about 0.15:1 and about 0.25:1. In certain such embodiments, the weight of the second assembly 220 divided by radius of the wheel 100 may be between about 0.8 lb/ft (approximately 1,200 g/m) and about 1 lb/ft (approximately 1,500 g/m). In certain alternative such embodiments, the weight of the second assembly 220 divided by radius of the wheel 100 may be between about 0.1 lb/ft (approximately 150 g/m) and about 2 lb/ft (approximately 3,000 g/m), between about 0.5 lb/ft (approximately 740 g/m) and about 1.5 lb/ft (approximately 2,200 g/m), or between about 0.75 lb/ft (approximately 1,100 g/m) and about 1.25 lb/ft (approximately 1,900 g/m). Other ratios and fractions are also possible.

In some embodiments, a mold or mold slide used to form the outer piece 220 includes a first surface (e.g., a generally flat surface) configured to substantially seal the inside of the inner piece 210 by engaging the rim 212 at a portion 242 that is raised with respect to the rest of the inside of the inner piece 210. In some embodiments, a mold used to form the outer piece 220 includes a second surface (e.g., a generally flat surface) configured to substantially seal the inside of the inner piece 210 by engaging the rim 212 at a portion 240 that is raised with respect to the rest of the outside of the inner piece 210. In some embodiments, the mass of material proximate to the portion 240 and/or the portion 242 may be reduced where such material intersects surrounding parts of the inner piece 220 (e.g., by making the portion 240 and/or the portion 242 thicker, by making the surrounding parts of the first piece 210 thinner, and/or by raising the portion 240 and/or the portion 242 relative to the surrounding parts of the inner piece 210 to space the intersection). Certain such features may reduce (e.g., minimize, eliminate) the possibility of sink marks (areas where the first material will be reduced due to fluid dynamics of molten first material) where the portion 240 and/or the portion 242 intersect the surrounding parts of the inner piece 210, which can cause the outer piece 220 to occupy the sink marks, thereby utilizing excess second material and causing the wheel 200 to have an unpleasing aesthetic appearance where a user may see the outer piece 220 where the inner piece 210 would be expected. Reducing sink marks, for example as described above, may advantageously provide a clean demarcation between materials, which can enhance the appearance of the wheel 200, and/or may reduce the amount of material used for the outer piece 220.

Figure 8A:
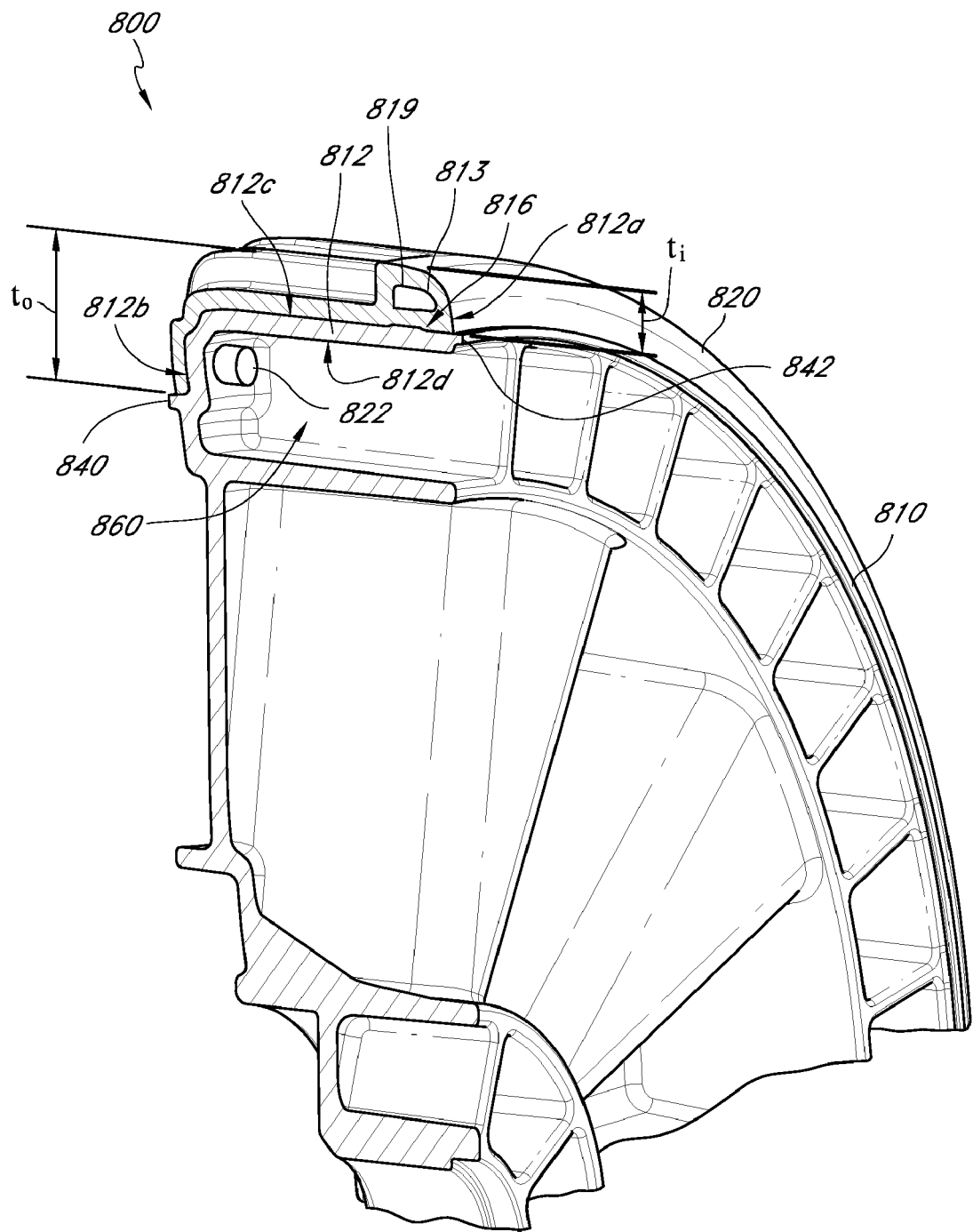
FIG. 8A is a cross-sectional view of another embodiment of a wheel.
Figure 8B:
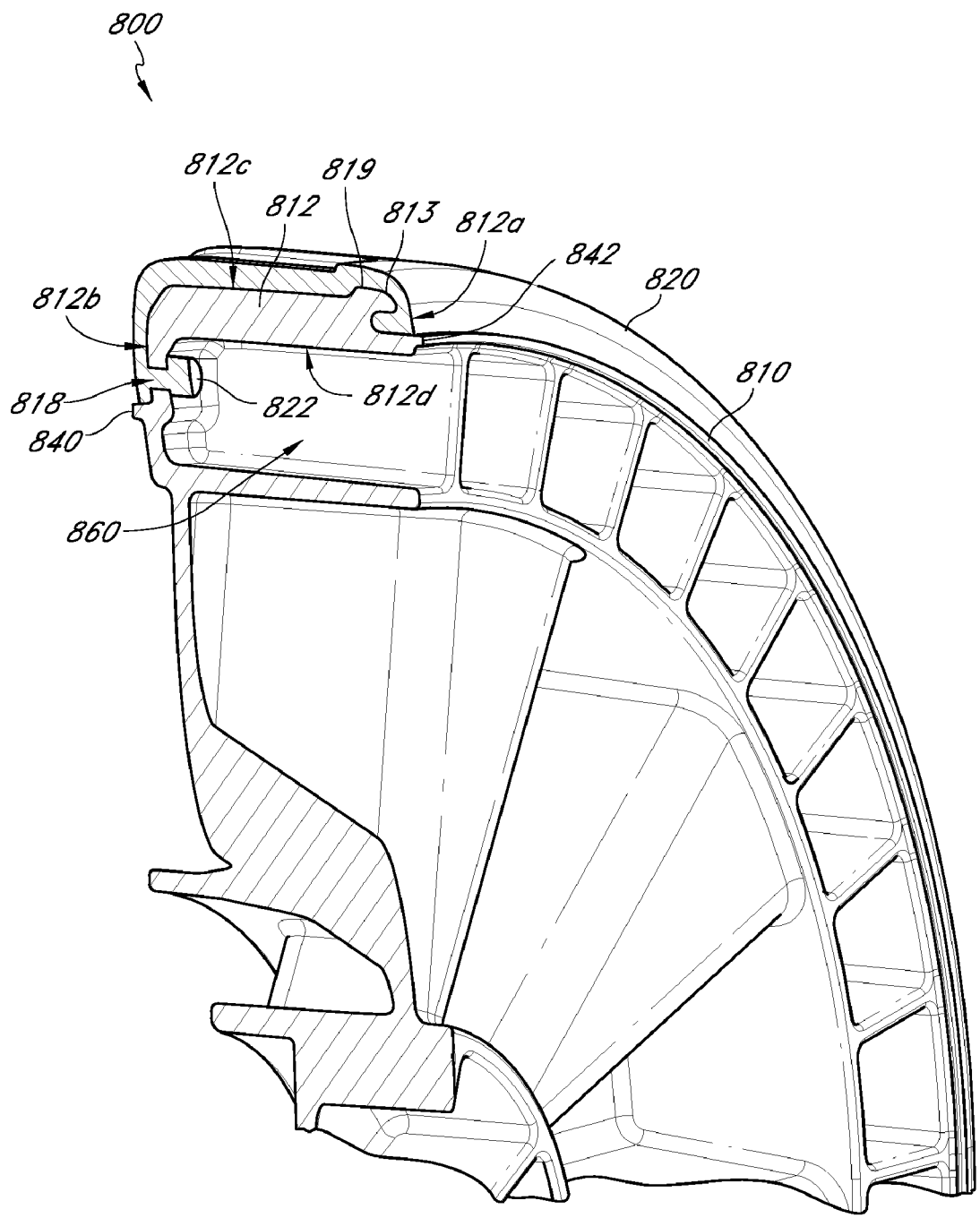
FIG. 8B is another cross-sectional view of the wheel of FIG. 8A.
Figure 8C:
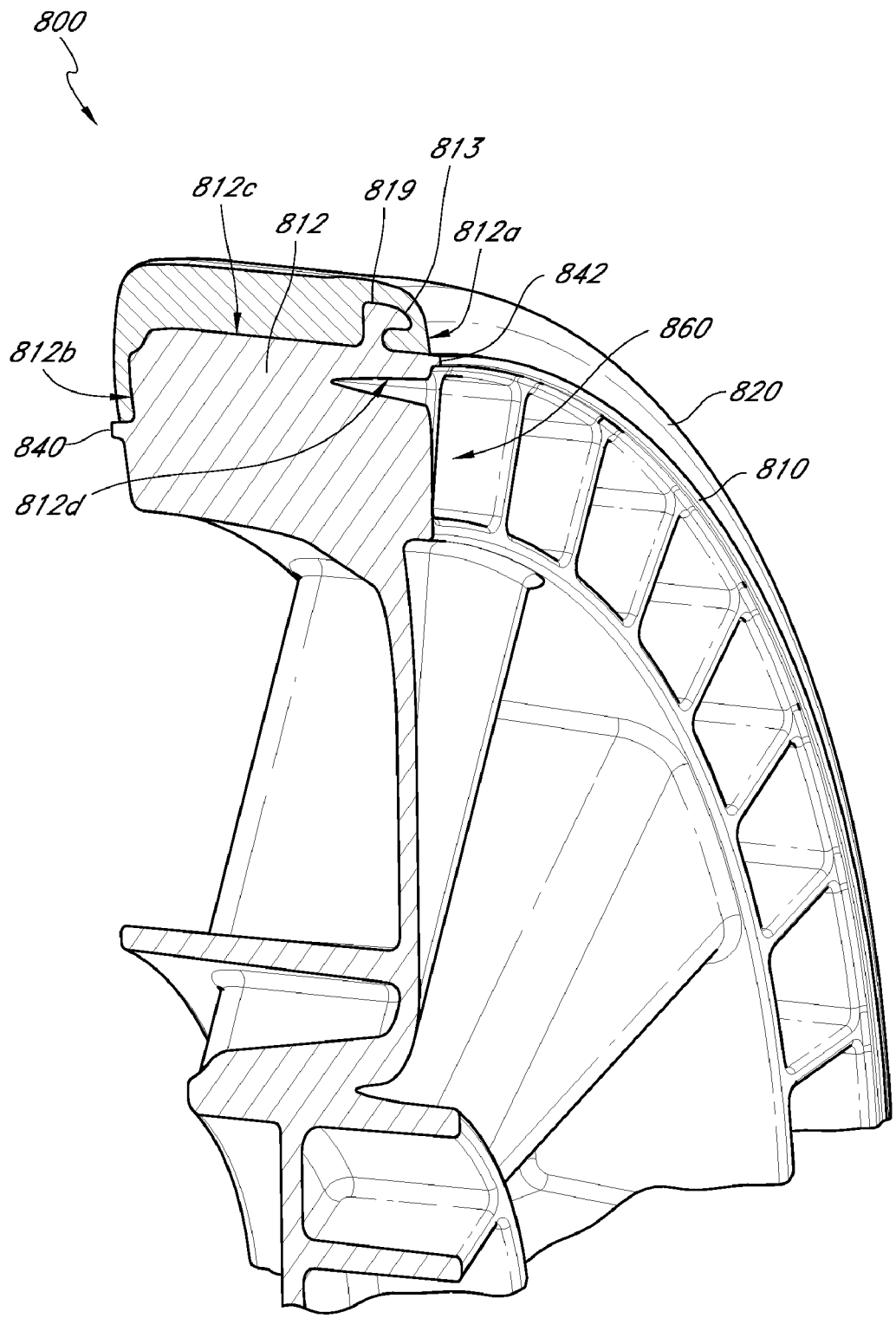
FIG. 8C is still another cross-sectional view of the wheel of FIG. 8A.

FIGS. 8A-8C illustrate cross-sectional views of another embodiment of a wheel 800. The cross-section of FIG. 8A is through an aperture 816. The cross-section of FIG. 8B is through a rib 817 and an aperture 818. The cross-section of FIG. 8C is through a portion of the rim 812 not comprising an aperture 816, 818 or a rib. Each cross section of the illustrated embodiment of the wheel 800 includes a rim 812 including the flange 819 and a lip 813. Each cross-section of the rim 812 of the first assembly 810 has a first side 812a, a second side 812b opposite the first side 812a, a ground-facing surface 812c, and a hub-facing surface 812d. The second assembly 820 is mechanically coupled through the rim 812 at the first side 812a of the rim 812 and the second side 812b of the rim 812. The second assembly 820 at least partially covers the ground-facing surface 812c of the rim 812. The second assembly 820 extends below (e.g., radially inward of) the hub-facing surface 812d of the rim 812. The hub-facing surface 812d of the rim 812 is generally devoid (e.g., substantially devoid, completely devoid as illustrated in FIGS. 8A-8C) of the second assembly 820. The second assembly 820 weaves through the apertures 816 on the first side 812a of the rim 812, as illustrated in FIG. 8A, and the second assembly 820 is further secured to the first side 812a by overlapping the lip 813, as illustrated in FIGS. 8B and 8C. The second assembly 820 also comprises a plurality of buttons (or knobs, protrusions, rivets, heads, etc.) 822 that weaves the second assembly 820 through the apertures 818 on the second side 812b of the rim 812, as illustrated in FIGS. 8A and 8B. Other mechanical and/or chemical couplings are also possible (e.g., an undercut as illustrated in FIG. 6B).

In some embodiments, a mold used to form the outer piece 820 includes a first surface (e.g., a generally flat surface) configured to substantially seal the inside of the inner piece 810 by engaging the rim 812 at a portion 842 that is raised with respect to the rest of the inside of the inner piece 810. In some embodiments, a mold used to form the outer piece 820 includes a second surface (e.g., a generally flat surface) configured to substantially seal the inside of the inner piece 810 by engaging the rim 812 at a portion 840 that is raised with respect to the rest of the outside of the inner piece 810. In some embodiments, the rim 840 comprises a shape (e.g., triangular, trapezoidal) configured to be compressed (e.g., deformed) by a surface of a mold. In certain such embodiments, the mass of material proximate to the portion 840 may be reduced (e.g., by raising the portion 840 relative to the surrounding parts of the inner piece 810 to space the intersection). In some embodiments, the rim 842 comprises a shape (e.g., triangular, trapezoidal) configured to be compressed (e.g., deformed) by a surface of a mold. In certain such embodiments, the mass of material proximate to the portion 842 may be reduced (e.g., by raising the portion 842 relative to the surrounding parts of the inner piece 810 to space the intersection). In some embodiments, the outer piece 820 does not extend to the edge of the rim 840 and/or the rim 842. Certain such features may reduce (e.g., minimize, eliminate) the possibility of sink marks (areas where the first material will be reduced due to fluid dynamics of molten first material) where the portion 840 and/or the portion 842 intersect the surrounding parts of the inner piece 810, which can cause the outer piece 820 to occupy the sink marks, thereby utilizing excess second material and causing the wheel 800 to have an unpleasing aesthetic appearance where a user may see the outer piece 820 where the inner piece 810 would be expected. Reducing sink marks, for example as described above, may advantageously provide a clean demarcation between materials, which can enhance the appearance of the wheel 800, and/or may reduce the amount of material used for the outer piece 820.

Figure 9A:
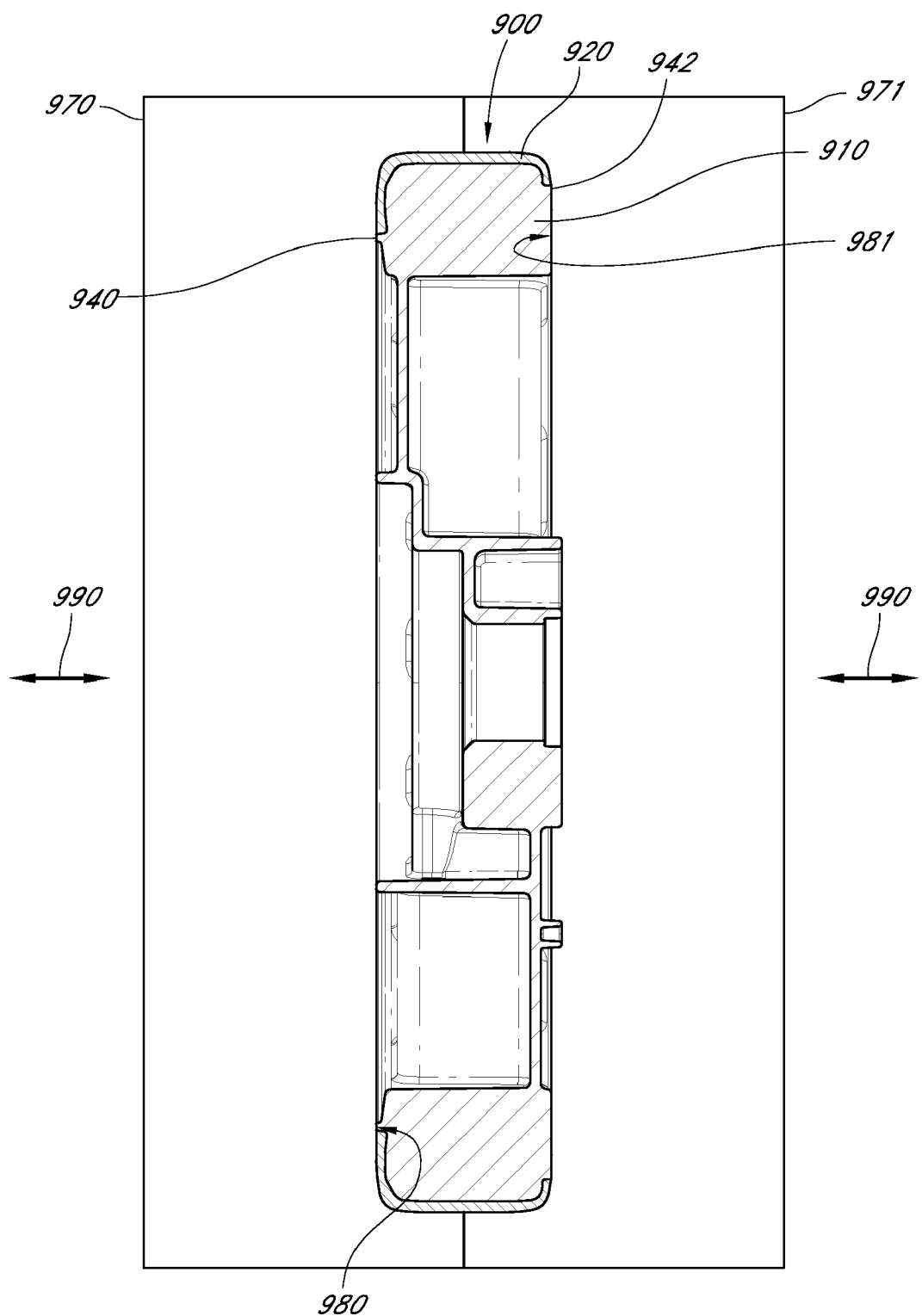
FIG. 9A illustrates a cross-section of an example embodiment of a portion of a method of manufacturing a wheel.

FIG. 9A illustrates a cross-section of an example embodiment of a portion of a method of manufacturing a wheel 900 (e.g., the wheel 200, the wheel 800). The method comprises forming a first material into a first part 910 of the wheel 900, for example injection molding the first part 910. The method further comprises molding a second material into a second part 920 of the wheel 900 using two mold pieces 970, 971, the result of which is illustrated in FIG. 9A. The first part 910 is disposed between the mold pieces 970, 971 by squeezing the molds 970, 971 together, as indicated by the arrows 990. The mold 970 comprises a surface 980 (e.g., a substantially flat surface) that bears against a rim 940 of the outside of the first part 910 to form a seal. In some embodiments, the mold 970 at least partially compresses the rim 940 to create a tighter seal. In certain such embodiments, the rim 940 comprises a shape (e.g., triangular, trapezoidal) configured to be compressed (e.g., deformed) by the surface 980. When the molten second material is injected between the molds 970, 971, the seal between the rim 940 and the surface 980 stops the flow of the second material, thereby forming a clean demarcation between the first part 910 and the second part 920, which may enhance the appearance of the wheel 900. In some embodiments, the seal between the rim 940 and the surface 980 reduces the amount of the second material used because the amount of second material lost due to seepage over the first part 910 is reduced (e.g., eliminated). In some embodiments, the mold 971 comprises a surface 981 (e.g., a substantially flat surface) that bears against a rim 942 of the inside of the first part 910 to form a seal. When the molten second material is injected between the molds 970, 971, the seal between the rim 942 and the surface 981 stops the flow of the second material, thereby forming a clean demarcation between the first part 910 and the second part 920. In some embodiments, the seal between the rim 942 and the surface 981 reduces the amount of the second material used because the amount of second material lost due to seepage over the first part 910 is reduced (e.g., eliminated). Although a clean demarcation between the first part 910 and the second part 920 may also be formed on the inside of the wheel 900, that portion of the wheel 900 is typically not in view such that enhancement of the aesthetic appearance is acceptable but is not necessarily desired. After molding the second part 920, the wheel 900 is removed from the molds 970, 971 by spreading the molds 970, 971, as indicated by the arrows 990.

Figure 9B:
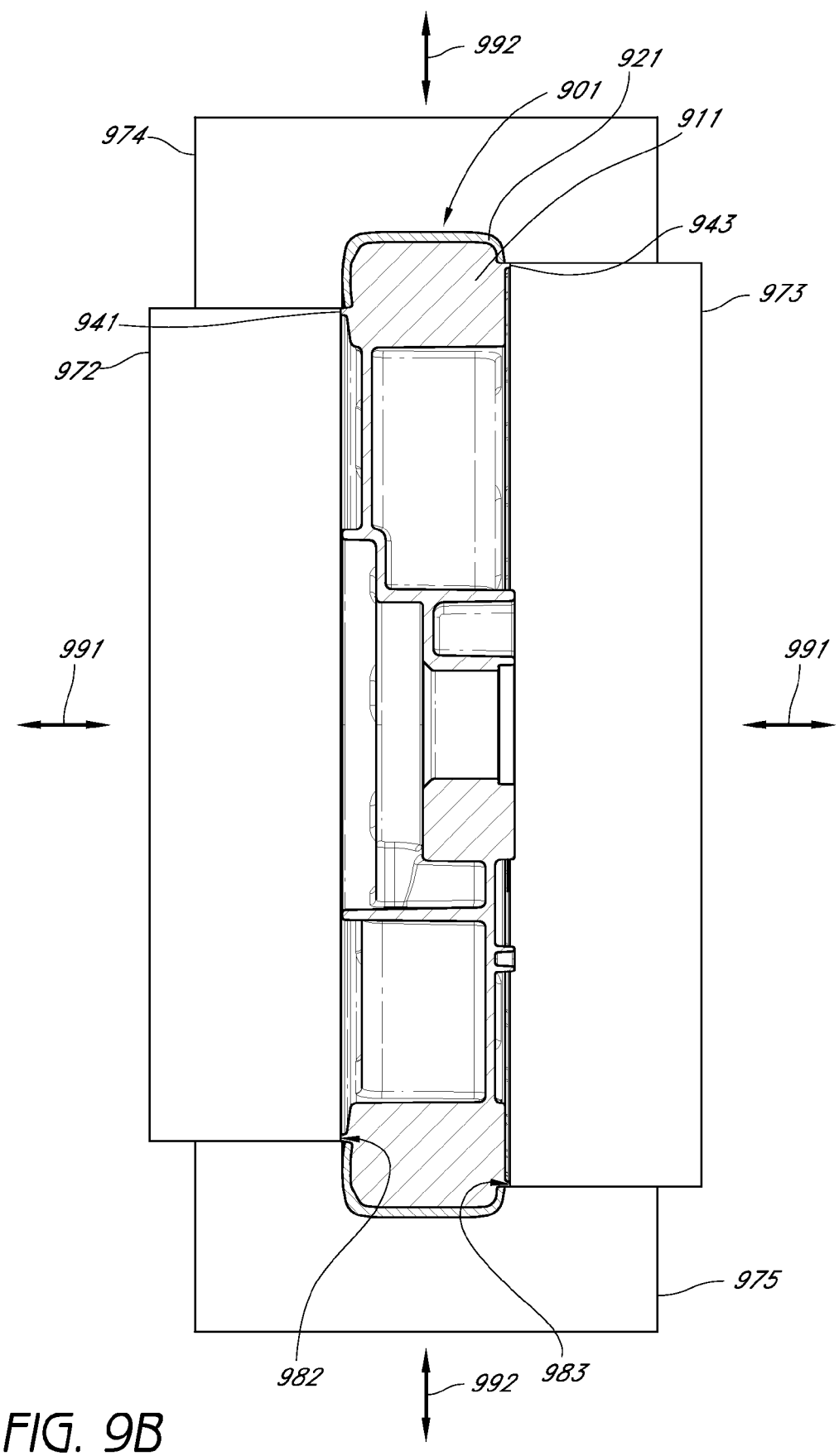
FIG. 9B illustrates a cross-section of another example embodiment of a portion of a method of manufacturing a wheel.

FIG. 9B illustrates a cross-section of another example embodiment of a method of manufacturing a wheel 901 (e.g., the wheel 200, the wheel 800). The method comprises forming a first material into a first part 911 of the wheel 901. In some embodiments, forming the first part 911 comprises using at least one of the mold pieces 972, 973 in conjunction with other mold pieces at least partially by squeezing the molds 972, 973 together, as indicated by the arrows 991. In certain alternative embodiments, forming the first part 911 uses entirely different molds, a different type of molding process, or a non-molding process. The method further comprises molding a second material into a second part 921 of the wheel 901 using four mold pieces 972, 973, 974, 975, the result of which is illustrated in FIG. 9B. The first part 911 is disposed between the mold pieces 972, 973, 974, 975. In certain embodiments, the mold 972 comprises a surface 982 (e.g., a substantially flat surface) that bears against a rim 941 of the outside of the first part 911 to form a seal. In some embodiments, the mold 972 at least partially compresses the rim 941 to create a tighter seal. In certain such embodiments, the rim 941 comprises a shape (e.g., triangular, trapezoidal) configured to be compressed (e.g., deformed) by the surface 982. When the molten second material is injected between the molds 972, 973, 974, 975, the seal between the rim 941 and the surface 982 stops the flow of the second material, thereby forming a clean demarcation between the first part 911 and the second part 921, which may enhance the appearance of the wheel 901. In some embodiments, the seal between the rim 941 and the surface 982 reduces the amount of the second material used because the amount of second material lost due to seepage over the first part 911 is reduced (e.g., eliminated). In some embodiments, a portion of the molds 974, 975 is configured to bear against the mold 972 to define the outside of the second part 921. In some embodiments, a portion of the molds 974, 975 is configured to bear against the rim 941 to define the outside of the second part 921. In certain such embodiments, the molds 972, 973 may be unused.

In certain embodiments, the mold 973 comprises a surface 983 (e.g., a substantially flat surface) that bears against a rim 943 of the outside of the first part 911 to form a seal. In some embodiments, the mold 973 at least partially compresses the rim 943 to create a tighter seal. In certain such embodiments, the rim 943 comprises a shape (e.g., triangular, trapezoidal) configured to be compressed (e.g., deformed) by the surface 983. When the molten second material is injected between the molds 972, 973, 974, 975, the seal between the rim 943 and the surface 983 stops the flow of the second material, thereby forming a clean demarcation between the first part 911 and the second part 921. In some embodiments, the seal between the rim 943 and the surface 983 reduces the amount of the second material used because the amount of second material lost due to seepage over the first part 911 is reduced (e.g., eliminated). In some embodiments, a portion of the molds 974, 975 is configured to bear against the mold 973 to define the inside of the second part 921. In some embodiments, a portion of the molds 974, 975 is configured to bear against the rim 943 to define the inside of the second part 921. In certain such embodiments, the molds 972, 973 may be unused. Although a clean demarcation between the first part 911 and the second part 921 may also be formed on the inside of the wheel 901, that portion of the wheel 901 is typically not in view such that enhancement of the aesthetic appearance is acceptable but is not necessarily desired. After molding the second part 921, the wheel 901 is removed from the molds 972, 973, 974, 975 by spreading the molds 972, 973, 974, 975, as indicated by the arrows 991, 992.

Figure 9C:
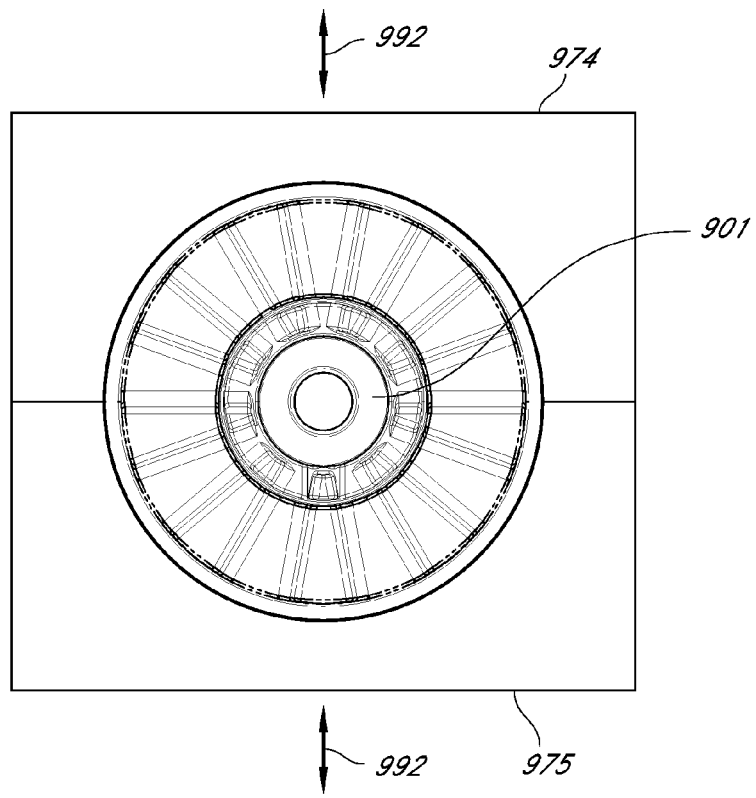
FIG. 9C is an elevational view of the portion of the method of FIG. 9B.
Figure 9D:
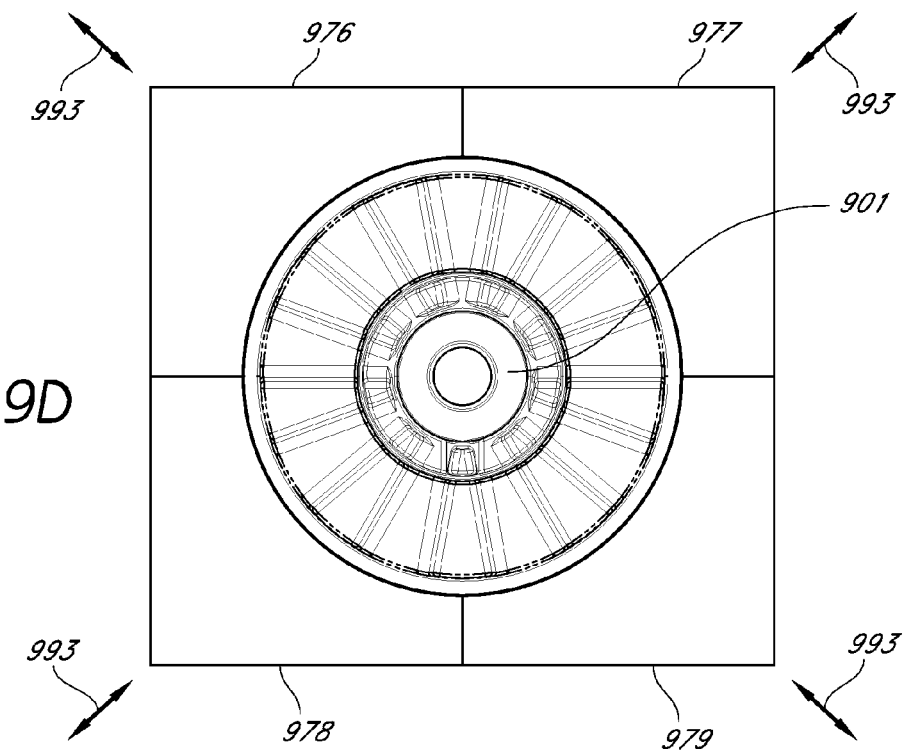
FIG. 9D is an elevational view of the portion of another method of manufacturing a wheel.

FIG. 9C is an elevational view of the molding process of FIG. 9B with the molds 972, 973 removed or unused. The molds 974, 975 each surround about half of the wheel 901. The molds 974, 975 are squeezed and spread as indicated by the arrows 992. FIG. 9D is an elevational view of another molding process with side molds removed or unused. The molds 976, 977, 978, 979 each surround about a quarter of the wheel 901. The molds 976, 977, 978, 979 are squeezed and spread as indicated by the arrows 993. The number of molds may be increased as the complexity of the second part 921 of the wheel 901 increases. For example, depending on the complexity of the second part 921, the method may comprise using from about 2 to about 20 molds and/or mold slides, from about 2 to about 8 molds and/or mold slides, and from about 2 to about 4 molds and/or mold slides. Other numbers of molds are also possible.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof For example and without limitation: different ratios, percentages, and fractions; different mechanical coupling methods; different quantities of apertures and/or buttons; different numbers, orientations, and designs of rib undercut features; different coverage of various surfaces; different types of materials; different wheel designs; different intended wheel uses; different axle attachment features; different inner portion shapes with corresponding different outer portion shapes, including using features to reduce the amount of material of the outer portion and/or to increase the apparent thickness of the outer portion; different part formation procedures including various molding techniques; different part coupling techniques including chemical and non-chemical bonding, hot and cold assembly, and immediate and time-lapse assembly; assembly after mounting to an axle or product; parts supplied by different entities; etc.

In addition, while several variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above.

What is claimed is:

1. A wheel comprising:
   an inner assembly including a rim generally formed around a hub, the rim including a cross-section having a first side, a second side generally opposite the first side, a ground-facing surface, and a hub-facing surface, wherein the rim includes a first plurality of apertures through the first side of the rim and a second plurality of apertures through the second side of the rim, the first plurality of apertures radially offset from the second plurality of apertures; and
   an outer assembly comprising a material different from that of the inner assembly, the outer assembly mechanically coupled through the rim at the first and second sides of the rim, the outer assembly at least partially covering the ground-facing surface of the rim and extending radially inward of the hub-facing surface of the rim, the hub-facing surface of the rim being generally devoid of the material of the outer assembly.

2. The wheel of claim 1, wherein the hub-facing surface of the rim is substantially devoid of the material of the outer assembly.

3. The wheel of claim 1, wherein the hub-facing surface of the rim is completely devoid of the material of the outer assembly.

4. The wheel of claim 1, wherein the inner assembly comprises high density polyethylene (HDPE) and the outer assembly comprises rubber or rubber-like material.

5. The wheel of claim 4, wherein the rubber or rubber-like material comprises thermoplastic elastomer (TPE).

6. The wheel of claim 4, wherein the rubber or rubber-like material comprises thermoplastic urethane (TPU).

7. The wheel of claim 1, wherein the outer assembly defines a plurality of buttons on an inner portion of the rim on the second side of the rim.

8. The wheel of claim 1, wherein the rim includes a flange proximate to the first side of the rim.

9. The wheel of claim 8, wherein the rim includes a plurality of ribs transverse to the flange.

10. The wheel of claim 9, wherein the rim includes a plurality of partially annular ribs transverse to the flange and substantially orthogonal to the ribs.

11. The wheel of claim 9, wherein the outer assembly is mechanically coupled through the rim at the first side of the rim between at least some of said ribs.

12. The wheel of claim 11, wherein the outer assembly is mechanically coupled through the rim at the second side of the rim radially inward from said ribs.

13. The wheel of claim 9, wherein the at least some of the ribs have different radial thicknesses.

14. The wheel of claim 8, wherein the flange includes a lip extending towards the first side of the rim, and wherein the outer assembly at least partially overlaps the lip.

15. The wheel of claim 1, wherein a radial width of the outer assembly at the second side of the rim is greater than a radial width of the outer assembly at the first side of the rim.

16. The wheel of claim 1, wherein a ratio of weight of the outer assembly to weight of the inner assembly is less than about 0.5:1.

17. The wheel of claim 1, wherein a ratio of a radial width of the outer assembly on the second side of the rim to a radius of the wheel is between about 0.1:1 and about 0.4:1.

18. The wheel of claim 1, further comprising a hub assembly configured to secure the wheel on an axle.

19. The wheel of claim 1, wherein the outer assembly comprises a plurality of recesses.

20. The wheel of claim 19, wherein the plurality of recesses comprises tread lines.

21. A wheel comprising:
   an inner assembly including a rim generally formed around a hub, the rim including a cross-section having a first side, a second side generally opposite the first side, a ground-facing surface, and a hub-facing surface, wherein the rim includes a flange proximate to the first side of the rim, wherein the rim includes a first plurality of apertures through the flange and a second plurality of apertures through the second side of the rim, the first plurality of apertures radially offset from the second plurality of apertures; and
   an outer assembly comprising a material different from that of the inner assembly, the outer assembly mechanically coupled through the rim at the first and second sides of the rim, the outer assembly at least partially covering the ground-facing surface of the rim and extending radially inward of the hub-facing surface of the rim, the hub-facing surface of the rim being generally devoid of the material of the outer assembly.

22. The wheel of claim 21, wherein the hub-facing surface of the rim is substantially devoid of the material of the outer assembly.

23. The wheel of claim 21, wherein the hub-facing surface of the rim is completely devoid of the material of the outer assembly.

24. The wheel of claim 21, wherein the inner assembly comprises high density polyethylene (HDPE) and the outer assembly comprises rubber or rubber-like material.

25. The wheel of claim 24, wherein the rubber or rubber-like material comprises thermoplastic elastomer (TPE).

26. The wheel of claim 24, wherein the rubber or rubber-like material comprises thermoplastic urethane (TPU).

27. The wheel of claim 21, wherein the outer assembly defines a plurality of buttons on an inner portion of the rim on the second side of the rim.

28. The wheel of claim 21, wherein the rim includes a plurality of ribs transverse to the flange.

29. The wheel of claim 28, wherein the rim includes a plurality of partially annular ribs transverse to the flange and substantially orthogonal to the ribs.

30. The wheel of claim 28, wherein the outer assembly is mechanically coupled through the rim at the first side of the rim between at least some of said ribs.

31. The wheel of claim 30, wherein the outer assembly is mechanically coupled through the rim at the second side of the rim radially inward from said ribs.

32. The wheel of claim 28, wherein the at least some of the ribs have different radial thicknesses.

33. The wheel of claim 21, wherein the flange includes a lip extending towards the first side of the rim, and wherein the outer assembly at least partially overlaps the lip.

34. The wheel of claim 21, wherein a radial width of the outer assembly at the second side of the rim is greater than a radial width of the outer assembly at the first side of the rim.

35. The wheel of claim 21, wherein a ratio of weight of the outer assembly to weight of the inner assembly is less than about 0.5:1.

36. The wheel of claim 21, wherein a ratio of a radial width of the outer assembly on the second side of the rim to a radius of the wheel is between about 0.1:1 and about 0.4:1.

37. The wheel of claim 21, further comprising a hub assembly configured to secure the wheel on an axle.

38. The wheel of claim 21, wherein the outer assembly comprises a plurality of recesses.

39. The wheel of claim 38, wherein the plurality of recesses comprises tread lines.

* * * * *